United States Patent [19]

Weaver et al.

[11] 4,400,318

[45] Aug. 23, 1983

[54] SUBSTITUTED 5-ACYL-3-CARBAMOYL-2-THIENYL AZO DYES WITH ANILINE, TETRAHYDROQUINOLINE, AND BENZOMORPHOLINE COUPLERS, PROCESS OF MANUFACTURE, AND POLYAMIDE TESTILE MATERIALS DYED THEREWITH

[75] Inventors: Max A. Weaver; Clarence A. Coates, Jr., both of Kingsport, Tenn.

[73] Assignee: Eastman Kodak Company, Rochester, N.Y.

[21] Appl. No.: 318,189

[22] Filed: Nov. 4, 1981

Related U.S. Application Data

[63] Continuation of Ser. No. 151,077, May 19, 1980, abandoned, which is a continuation of Ser. No. 960,686, Nov. 14, 1978, abandoned.

[51] Int. Cl.³ .................. C09B 29/033; C09B 29/09; C09B 29/34; C09B 29/44
[52] U.S. Cl. .................... 260/152; 260/154; 260/155; 260/156; 260/157; 260/158; 544/105; 546/178; 546/179; 546/181; 549/68; 549/84
[58] Field of Search .............. 260/152, 155, 332.2 C

[56] References Cited

U.S. PATENT DOCUMENTS

| 2,805,218 | 9/1957 | Towne et al. | 260/152 |
| 2,827,450 | 3/1958 | Towne et al. | 260/152 |
| 4,055,556 | 10/1977 | Aeberli | 260/152 |
| 4,079,450 | 3/1978 | Baird et al. | 260/152 |
| 4,140,683 | 3/1979 | Weaver et al. | 260/152 |

FOREIGN PATENT DOCUMENTS

| 2612792 | 10/1976 | Fed. Rep. of Germany | 260/152 |
| 1351381 | 4/1974 | United Kingdom | 260/152 |
| 1389266 | 4/1975 | United Kingdom | 260/152 |
| 1394365 | 5/1975 | United Kingdom | 260/152 |
| 1394367 | 5/1975 | United Kingdom | 260/152 |
| 1394368 | 5/1975 | United Kingdom | 260/152 |

OTHER PUBLICATIONS

Eugster et al., (I), Index Chemicus, vol. 8, No. 1, #24199 (1963).
Eugster et al., (II), Chemical Abstracts, vol. 58, 5608–5609 (1963).

*Primary Examiner*—Floyd D. Higel
*Attorney, Agent, or Firm*—Donald W. Spurrell; Daniel B. Reece, III

[57] ABSTRACT

Disclosed are azo compounds having the formula

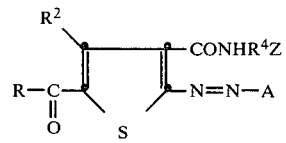

in which $R^4$ is straight or branched lower alkylene, Z is 1–3 groups selected from such heteroatom groups as —OH, lower alkanoyloxy, lower alkoxy, lower alkoxycarbonyl, lower alkoxyalkoxy, mono- or dialkylamino, —CN, carbamoyl, formamide, lower alkyl substituted carbamoyl, lower alkoxycarbonylamino, lower alkanoylamino, hydroxy substituted lower alkoxy, halogen, lower alkylthio, lower alkylsulfonyl, and various heterocyclic groups such as furyl and pyrrolidono, R is selected from straight or branched lower alkyl, phenyl and phenyl substituted with straight or branched lower alkyl, halogen, or straight or branched lower alkoxy, $R^2$ is hydrogen or lower alkyl, and A is an aniline, tetrahydroquinoline, or benzomorpholine coupler component which may be substituted with a wide variety of groups. These azo compounds produce red to blue shades on polyamide, polyester and cellulose acetate fibers and exhibit markedly improved properties such as fastness and dyeability, particularly on synthetic polyamide fibers.

10 Claims, No Drawings

SUBSTITUTED 5-ACYL-3-CARBAMOYL-2-THIENYL AZO DYES WITH ANILINE, TETRAHYDROQUINOLINE, AND BENZOMORPHOLINE COUPLERS, PROCESS OF MANUFACTURE, AND POLYAMIDE TEXTILE MATERIALS DYED THEREWITH

This is a continuation of application Ser. No. 151,077, filed May 19, 1980, now abandoned, which is a continuation of Ser. No. 960,686 filed Nov. 14, 1978, now abandoned.

This invention concerns certain novel azo compounds and polyamide textile materials dyed therewith. More particularly, this invention concerns monoazo disperse dyes containing novel thiophene diazo components. These dyes produce red to blue shades on polyamide, polyester and cellulose acetate fibers and exhibit markedly improved properties such as fastness and dyeability, particularly on synthetic polyamide fibers.

Our novel compounds have the general formula

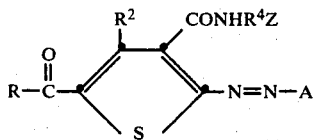

wherein $R^4$ is straight or branched lower alkylene, Z is 1-3 heteroatom groups selected from —OH, lower alkanoyloxy, lower alkoxy, lower alkoxycarbonyl, lower alkoxy-alkoxy, mono- or dialkylamino, —CN, carbamoyl, lower alkoxycarbonylamino, formamido, lower alkyl substituted carbamoyl, lower alkanoylamino, hydroxy substituted lower alkoxy, halogen, lower alkylthio, lower alkylsulfonyl, furyl and pyrrolidono, R is selected from straight or branched lower alkyl, phenyl and phenyl substituted with straight or branched lower alkyl, halogen, or straight or branched lower alkoxy, $R^2$ is hydrogen or lower alkyl, and A is an aniline, tetrahydroquinoline, or benzomorpholine coupler component which may be substituted with a wide variety of groups. The term "lower" as used throughout this specification means 1-6 carbons.

The couplers have the formulae

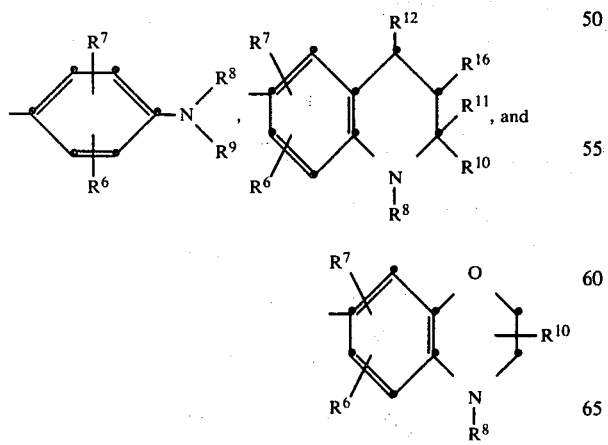

wherein $R^6$ and $R^7$ are each selected from hydrogen, fluorine, chlorine, bromine, lower alkyl, cycloalkyl, lower alkoxy, phenoxy, lower alkylthio, arylthio, and radicals having the formula —NH—X—$R^{13}$ in which X is —CO—, —COO—, or —SO$_2$— and $R^{13}$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is —CO—, $R^{13}$ also can be hydrogen, amino, lower alkylamino, lower alkylcarbamoyl, lower dialkylamino, arylamino, aryl, or furyl;

$R^8$ and $R^9$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1-8 carbons and such alkyl substituted with the following: hydroxy, halogen; cyano; succinimido; glutarimido; phthalimido; 2-pyrrolidono; cyclohexyl; phenyl or phenyl substituted with lower alkyl, lower alkoxy, halogen, lower alkanoylamino, cyano or lower alkoxycarbonyl; lower alkanoylamino; sulfamoyl; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; groups of the formula

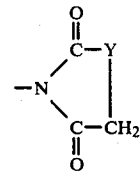

wherein Y is —NH—, —NH-lower alkyl, —O—, —S—, or —CH$_2$O—; —S-$R^{14}$ wherein $R^{14}$ is lower akyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, triazolyl, or

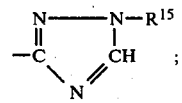

—SO$_2$$R^{13}$; —COO$R^{13}$; —OX$R^{13}$; —NH-X-$R^{13}$; —X-$R^{13}$; —OCO-$R^{13}$; —CON$R^{15}$$R^{15}$; —SO$_2$N$R^{15}$$R^{15}$; wherein $R^{13}$ and X are as defined above and each $R^{15}$ is selected from H and $R^{13}$; lower alkoxy; lower alkoxy substituted with hydroxy, cyano, lower alkanoyloxy, or lower alkoxy; phenoxy substituted with one or more of lower alkyl, lower alkoxy or halogen; and $R^8$ and $R^9$ can be a single, combined group which, with the nitrogen atom to which each is attached, forms a ring such as pentamethylene, ethyleneoxyethylene, ethylenesulfonylethylene;

$R^{10}$, $R^{11}$ and $R^{12}$ are each selected from hydrogen and lower alkyl; and $R^{16}$ is selected from —OH, —Cl, —CONH$_2$, —CONH-lower alkyl, lower alkoxy, phenoxy, —SR$^{14}$, and —OXR$^{13}$ wherein $R^{13}$ and $R^{14}$ are as defined above.

The azo compounds of the invention produce red to blue shades on polyamide, polyester and cellulose acetate fibers, yarns and fabrics when applied thereto according to conventional disperse dyeing procedures. These compounds are especially valuable for dyeing synthetic polyamide fibers on which the compounds exhibit good to excellent dyeability and fastness properties, such as fastness to high humidity ozone, light, crock, washing, gas (nitrogen oxides). The good dyeability of our compounds is manifested by the level shades they produce on synthetic polyamide fibers and their ability to build, i.e., produce significantly heavier shades as increased amounts of dye are applied to a given weight of undyed fibers. The dyes also exhibit improved properties such as migration, transfer and pH stability. This desirable combination of properties which our azo compounds exhibit renders them especially valuable for dyeing carpets made from synthetic polyamide fibers and distinguishes them from known azo compounds containing a thiophene diazo component, for example, those of British Pat. No. 1,427,195.

Following are some exemplary preparations of useful couplers.

2,7-Dimethyl-N-Ethyl-1,2,3,4-Tetrahydroquinoline

A mixture of 2,7-dimethyl-1,2,3,4-tetrahydroquinoline (48.3 g. 0.3 m), potassium carbonate (41.4 g, 0.3 m), and iodoethane (100 g) was heated at reflux for 4 hrs. Water (200 ml) was added and then the organic layer was extracted using chloroform (100 ml). The organic layer was separated and dried over sodium sulfate. Chloroform and excess iodoethane were distilled off to leave essentially pure product (44 g), which was used without further purification.

N-Ethyl-3-Hydroxy-7-Methyl-1,2,3,4-Tetrahydroquinoline

N-ethyl-m-toluidine (1.0 mole) and epichlorohydrin (225 g) were mixed and allowed to stand three days at room temperature. The reaction mixture was heated at 140°–145° C. for 6 hrs. and then distilled under vacuum. The product (100 g) which boiled at 143° C. at 1.1 mmHg was recovered in 52% of the theoretical yield.

2,7-Dimethyl-N-Isopropyl-1,2,3,4-Tetrahydroquinoline

A mixture of 2,7-dimethyl-1,2,3,4-tetrahydroquinoline (32.2 g, 0.2 m), potassium carbonate (15.0 g, 0.11 m), and 2-iodopropane (51 g, 0.3 m) was heated at 90°–95° C. for 5.5 hr. Progress of the reaction was slow. An additional quantity (34.0 g) of iodopropane was added and the mixture refluxed for 24 hrs. longer. Starting material was still evident by thin-layer chromatography. The reaction mixture was drowned into 200 ml water and extracted with chloroform (50 ml). The organic layer was treated with 10 ml of acetic anhydride for 1 hr. at 90°–95° C. to convert the 2,7-dimethyl-1,2,3,4-tetrahydroquinoline into N-acetyl-2,7-dimethyl-1,2,3,4-tetrahydroquinoline, which enables the recovery of the pure product by distillation. The organic layer was distilled under vacuum to give 23.4 g (55% yield) of product which boiled at 85° C. at 0.21.1 mm Hg.

2,5-Dimethyl-8-Methoxy-1,2,3,4-Tetrahydroquinoline

A mixture of the above 2,5-dimethyl-8-methoxyquinoline (260 g, 1.3 m), isopropanol (600 ml), and Raney nickel catalyst (25.0 g) was subjected to 1000 psi hydrogen for 3 hrs. in a stainless steel autoclave. The reaction mixture from the autoclave was filtered to remove the catalyst. Essentially a quantitative yield of product was obtained, after the removal of the isopropanol under vacuum, and the product was used without further purification.

2,5-Dimethyl-N-(2-Hydroxyethyl)-8-Methoxy-1,2,3,4-Tetrahydroquinoline 2,5-Dimethyl-8-methoxy-1,2,3,4-tetrahydroquinoline (189 g, 1.0 m) was reacted with ethylene oxide (52.0 g) in an autoclave at 160° C. for 10 hrs. The reaction mixture from the autoclave was distilled under vacuum to yield 169 g (72%) of product which boiled at 150°–138° C. at 1.7/0.5 mm Hg. A small amount of material was slurried in hexane, and after filtering and drying the product melted at 65°–67° C.

The dye compounds of our invention which are especially valuable polyamide dyes because of their cost and performance, including shade, dyeability and fastness properties, on polyamide fibers are those having the formula

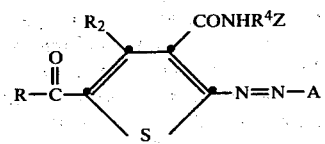

wherein
R is straight or branched alkyl of 1–6 carbons;
$R^2$ is hydrogen;
$R^4$ is lower alkylene;
Z is one or two groups selected from hydroxy, carbamoyl, lower alkanoylamino, alkoxy, hydroxyalkoxy, pyrrolidono, and lower alkanoyloxy;
and wherein A has the formulae

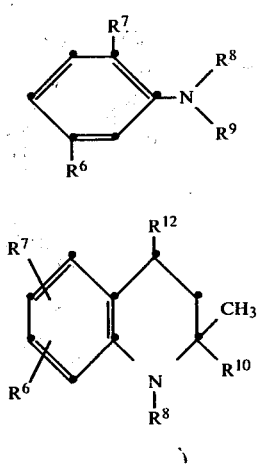

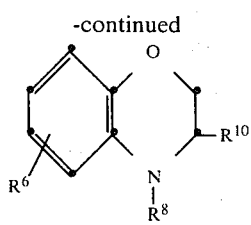

wherein

R[6] is lower alkyl, lower alkoxy, lower alkanoylamino, or lower alkoxycarbonylamino;

R[7] is hydrogen, lower alkyl, or lower alkoxy;

R[8] and R[9] are the same or different and selected from hydrogen; lower alkyl; lower alkyl substituted with hydroxy, alkoxy, alkoxyalkoxy, hydroxyalkoxy, carbamoyl, lower alkylcarbamoyl, lower alkanoylamino, sulfamoyl, lower alkylsulfamoyl, phenyl, cyclohexyl, 2-pyrrolidone, phthalimido, succinimido, cyano, phenoxy, alkylsulfonyl, phthalimidinyl, benzoylsulfonicimidyl, triazolylthio, lower alkylsulfonamido, —SO$_2$NH$_2$, —SO$_2$NHR, phenylsulfonamido, lower alkoxycarbonylamino, lower alkylcarbamoyloxy, lower alkoxycarbonyl, lower alkoxycarbonyloxy;

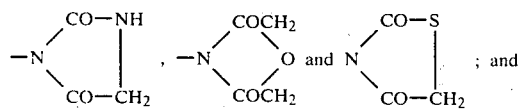

R[10] and R[12] are each hydrogen or lower alkyl.

Our novel compounds are synthesized by the novel procedure of diazotizing the thiophene ester, coupling the resulting diazonium salt with a disperse dye coupler and then forming the amide derivative by ester-amide interchange at the 3-position. The novel process is more particularly defined as the process for preparing carbamoyl derivatives comprising reacting a compound of the formula

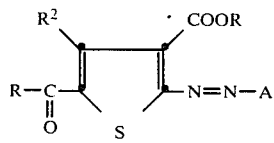

wherein R is selected from straight or branched lower alkyl, phenyl, and phenyl substituted with straight or branched lower alkyl, halogen, or straight or branched lower alkoxy, R[2] is hydrogen or lower alkyl, and A is an aniline, tetrahydroquinoline, or benzomorpholine coupler moiety, with an amine of the formula H$_2$N-R[4]Z wherein RHU 4 and Z are as defined above. The above thiophene ester intermediates and their preparation are more fully disclosed in British Pat. No. 1,427,195, particularly page 5, and the references cited thereon. More specifically, an examplary procedure is as follows:

2-Amino-3-carbomethoxy-5-(2-methyl-1-oxopropyl)-thiophene is diazotized preferably using nitrosyl sulfuric acid in 60% acetic acid. The amine (0.01 mole) is added to 30 g of 60% acetic acid containing 2 g of concentrated sulfuric acid at 10°–15° C. The slurry is cooled and a solution of sodium nitrite (0.72 g) dissolved in concentrated sulfuric acid (5 ml) is added at 0°–5° C. After stirring for one hour at 0°–5° C., the diazotization is essentially complete and a brownish red solution is obtained. This diazonium solution is added to 1,2,3,4-tetrahydro-1-(2-hydroxyethyl)-2,7-dimethyl quinoline dissolved in 15% sulfuric acid or 1:5 acid (1 part propionic acid:5 parts acetic acid). The coupling is neutralized to Congo Red test paper with solid ammonium acetate. After coupling for 1–2 hours at about 10°–15° C., water is added to precipitate the dye which is collected by filtration, washed with water, and dried in air. The crude dye, in most instances is purified by a hot methanol reslurry. The ester intermediate (0.5 g), 5 ml of 2-hydroxyethylamine, and 10 ml of isopropyl alcohol solvent are heated at reflux until the reaction is completed as evidenced by paper chromatography (0.25–0.5 hr.). The dye is isolated by the addition of water or by drowning into water. After being filtered and washed free of amine residues with water, the dye is dried in air. In general, the dye is pure at this stage and requires no further purification. In many cases the ester intermediate may be heated in the aliphatic amine without additional solvent at its boiling point or about 90°–95° C. until the interchange is complete, and then isolating the product as above. Other useful solvents include N,N-dimethylformamide, methyl Cellosolve, ethylene glycol and acetonitrile, and in general any solvent which will facilitate solution of the ester intermediate with the amine may be used. Lower temperatures down to about 25° C. may be used for the ester-amide interchange, but it is preferred to use from about 50° C. to about 100° C.

The amine diazo precursors are prepared according to procedures well documented in the literature: Z Chem., Volume 2, page 305 (1962); Chem, Ber., Volume 98, page 3571 (1965) and Volume 99, page 2712 (1966); and Chem. Heterocyclic Compounds, Volume 2, page 285 (1966); and Volume 3, page 178 (1967). For example, an aldehyde or ketone having an unsubstituted or substituted α-methyl group can be condensed with an active cyanomethylene compound and elemental sulfur in the presence of a secondary amine. A second technique involves treating an activated vinyl compound bearing an unsubstituted or substituted β-methylene group with elemental sulfur in the presence of a secondary aliphatic amine. These reactions may be diagrammed as follows:

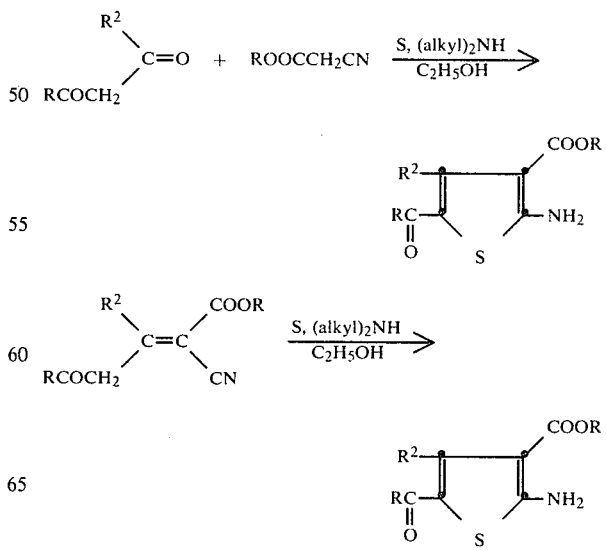

Amines obtained by the above procedures can be modified, for example, by bromination followed by nucleophilic displacement reactions.

The novel azo compounds can be applied to synthetic polyamide, polyester, and cellulose acetate fibers according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

The azo compound (16.7 mg.) of Example (A) above is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. The fabric is dyed a bright shade of blue exhibiting excellent fastness properties when tested in accordance with the procedures described in the Technical Manual of the American Association of Textile Chemists and Colorists, 1968 edition.

The synthetic polyamide fibers which can be dyed with the novel azo compounds are well known and have a basis of a linear polyamide such as nylon 66 (polyhexamethylene adipamide) manufactured by the polymerization of adipic acid and hexamethylenediamine, nylon 6 (polycaprolactam) prepared from epsilonaminocaproic acid lactum (caprolactum) and nylon 8. A detailed description of the synthetic polyamide materials which are dyed bright, fast shades by the compounds of the invention is set forth in U.S. Pat. No. 3,100,134.

The azo compounds described in the examples of following Tables I, II and III conform, respectively, to the general formulae

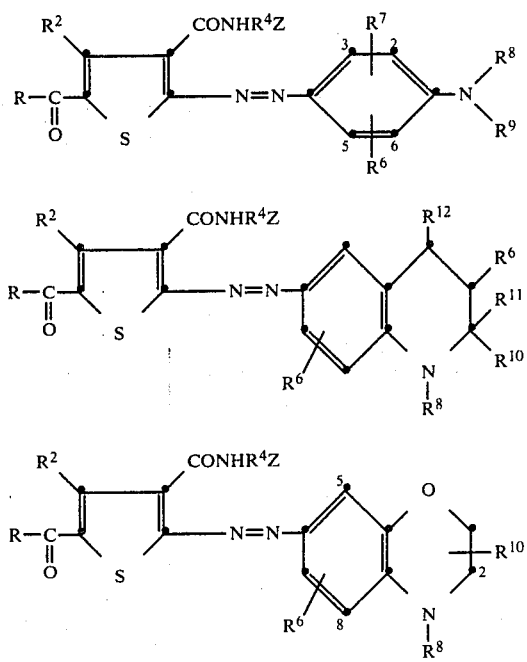

TABLE I

| Ex. No. | 3-CONHR⁴Z, R², RC(=O)— | R⁶, R⁷ | R⁸ | R⁹ |
|---|---|---|---|---|
| 1 | 3-CONHC₂H₄OH—5-(CH₃)₂CHC(=O)— | 3-CH₃ | —CH₂CH(OH)CH₂OH | —C₂H₅ |
| 2 | " | " | —C₂H₅ | —C₂H₄OH |
| 3 | " | " | " | —C₂H₅ |
| 4 | " | 2-OCH₃—5-CH₃ | " | —C₂H₄OH |
| 5 | 3-CONHC₃H₆OCH₃—5-(CH₃)₂CHC(=O)— | 3-CH₃ | —CH₂CH(OH)CH₂OH | —C₂H₅ |
| 6 | " | " | —C₂H₅ | —C₂H₄OH |
| 7 | " | " | " | —C₂H₅ |
| 8 | " | 2-OCH₃—5-CH₃ | " | —C₂H₄OH |
| 9 | " | 3-CH₃ | —CH₂CH(OH)CH₂OH | —C₂H₅ |
| 10 | 3-CONHC₂H₄OC₂H₄OH—5-(CH₃)₂CHC(=O)— | " | —C₂H₅ | —C₂H₄OH |
| 11 | 3-CONHC₂H₄NHCOC₂H₅—5-(CH₃)₂CHC(=O)— | " | " | —C₂H₅ |
| 12 | " | 2-OCH₃—5-CH₃ | —CH₂CH₂NHCOCH₃ | —C₂H₄OH |
| 13 | " | 3-NHCOCH₃ | " | —C₂H₅ |
| 14 | 3-CONHC₂H₄OH—5-(CH₃)₂CHC(=O)— | 3-CH₃ | " | " |
| 15 | " | H | —C₂H₅ | " |
| 16 | " | " | " | " |
| 17 | " | " | " | —CH₂CH₂OH |
| 18 | " | " | " | —CH₂CH₂Cl |
| 19 | " | " | " | —CH₂CH₂Br |
| 20 | " | " | " | —CH₂CH₂CN |

TABLE I-continued

| Ex. No. | 3-CONHR⁴Z, R², RC(=O)- | R⁶, R⁷ | R⁸ | R⁹ |
|---|---|---|---|---|
| 21 | | | | —CH₂CH₂NHCOC₂H₅ |
| 22 | " | " | —CH₂CH₂CN | —C₂H₅ |
| 23 | " | " | —CH₂CH₂OH | —CH₂CH₂OH |
| 24 | " | 3-CH₃ | —CH₂CH₂Cl | —CH₂CH₂Cl |
| 25 | " | " | —C₂H₅ | —CH₂CH₂SC₂H₅ |
| 26 | " | " | " | —CH₂CH₂CONH₂ |
| 27 | " | 3-NHCOCH₃ | —CH₂CH₂NHCOCH₃ | —CH₂CH₂CONH₂ |
| 28 | " | " | " | —C₂H₅ |
| 29 | " | 3-NHCOCH₃ | —C₂H₅ | |
| 30 | " | 3-NHCOCH₂OH | H | |
| 31 | " | 3-NHCOCH₂OOCCH₃ | " | |
| 32 | " | 3-NHCOCH₂CN | " | |
| 33 | " | 3-NHCOCH₂CONH₂ | —CH₂C₆H₅ | |
| 34 | " | 3-NHCOC₆H₅ | —CH₂CH₂CH₃ | |
| 35 | " | 3-NHCOC₆H₁₁ | " | |
| 36 | " | | " | |
| 37 | " | 3-NHCOC₂H₅ | " | ![ring: —C₂H₄—N(CO—CH₂—CO—CH₂) ring] —C₂H₄—N〈CO—CH₂ / CO—CH₂〉 |
| 38 | " | 2,5-di-Cl | —(CH₂)₃CH₃ | —C₂H₄—N〈CH₂—COCH₃ / CH₂—COCH₃〉 |
| 39 | " | 2-CH₃—5-OCH₃ | —C₂H₅ | —C₂H₅ |
| 40 | " | 2-OCH₃—5-NHCOCH₃ | H | —C₂H₄—N〈CO—C₆H₄—CO〉 |
| 41 | " | 2-CH₃ | " | |

TABLE I-continued $R^2, RC(=O)-, CONHR^4Z$ group on thiophene; aniline has $R^6, R^7, N(R^8)(R^9)$

| Ex. No. | 3-CONHR$^4$Z, R$^2$, RC(=O)— | R$^6$, R$^7$ | R$^8$ | R$^9$ |
|---|---|---|---|---|
| 42 | 3-CONHR$^4$Z | 2-Cl | —C$_2$H$_5$ | —C$_2$H$_5$ |
| 43 | " | 2-OCH$_3$ | " | " |
| 44 | " | 3-OCH$_3$ | " | " |
| 45 | " | 3-Cl | —CH$_2$C$_6$H$_5$ | —C$_6$H$_{11}$ |
| 46 | " | 2,5-di-OCH$_3$ | —C$_2$H$_5$ | —C$_2$H$_5$ |
| 47 | " | " | —CH$_2$C$_6$H$_5$ | —CH$_2$CH=CH$_2$ |
| 48 | " | " | —CH$_2$C$_6$H$_5$—p-CH$_3$ | —CH$_2$CH$_2$NHCOOC$_2$H$_5$ |
| 49 | " | 3-NHCOCH$_3$ | —C$_6$H$_5$ | —CH$_2$CH$_2$SO$_2$CH=CH$_2$ |
| 50 | " | " | —C$_6$H$_4$—p-OCH$_3$ | —CH$_2$CH$_2$NHCOCH=CH$_2$ |
| 51 | " | " | —C$_6$H$_4$—p-Cl | —C$_2$H$_5$ |
| 52 | " | " | —C$_2$H$_5$ | —CH$_2$CH$_2$CH$_3$ |
| 53 | " | " | —C$_6$H$_4$—p-CN | —CH$_2$CH$_2$OH |
| 54 | " | 2-CH$_3$—5-NHCOCH$_3$ | —C$_6$H$_4$—p-COOCH$_3$ | —CH$_2$CH$_2$Cl |
| 55 | " | 2-CH$_3$—5-NHCOOC$_2$H$_5$ | H | —C$_2$H$_5$ |
| 56 | " | 2-OCH$_3$—5-NHCOCH$_3$ | " | —CH$_2$CH(CH$_3$)$_2$ |
| 57 | " | " | " | —CH$_2$CH$_2$CN |
| 58 | " | " | " | —C$_2$H$_4$COOC$_2$H$_5$ |
| 59 | " | 3-NHCOCH$_3$ | —C$_2$H$_5$ | —C$_2$H$_4$COOC$_2$H$_4$OCH$_3$ |
| 60 | " | 3-CH$_3$ | —CH$_2$CH$_2$CN | —C$_2$H$_4$OCOCH$_3$ |
| 61 | " | H | —CH$_2$CH$_2$OOCCH$_3$ | —C$_2$H$_4$COCH$_2$CN |
| 62 | " | 3-CH$_3$ | —CH$_2$CH$_2$OCOCH$_2$CN | —C$_2$H$_4$OCOC$_2$H$_5$ |
| 63 | " | 3-NHCOCH$_3$ | —CH$_2$CH$_2$OH | —C$_2$H$_5$ |
| 64 | " | " | —(CH$_2$)$_3$NHCOCH$_3$ | —C$_2$H$_4$NHCOOC$_2$H$_5$ |
| 65 | " | 3-CH$_3$ | —C$_2$H$_5$ | —C$_2$H$_4$NHC(=O)C$_6$H$_5$ |
| 66 | " | | | |
| 67 | " | | | |
| 68 | " | 3-NHCOCH$_3$ | " | —C$_2$H$_4$NHC(=O)C$_6$H$_4$-p-OCH$_3$ |
| 69 | " | H | " | —C$_2$H$_4$OCOOC$_2$H$_4$OCH$_3$ |
| 70 | " | 3-CH$_3$ | " | —C$_2$H$_4$CONH$_2$ |
| 71 | | | | |

TABLE I-continued $$R-\overset{\overset{O}{\|}}{C}-S$$ ... CONHR⁴Z ... N=N ... with R⁶, R⁷, R⁸, R⁹ substituents on phenyl

| Ex. No. | 3-CONHR⁴Z, R², RC(=O)— | R⁶, R⁷ | R⁸ | R⁹ |
|---|---|---|---|---|
| 72 | 3-CONHR⁴Z | 3-NHCOCH₃ | " | —C₂H₄CONHC₂H₄OH |
| 73 | " | H | " | —C₂H₄CON(C₂H₄OH)₂ |
| 74 | " | 3-CH₃ | " | —C₂H₄CONHC₃H₆OCH₃ |
| 75 | " | 3-NHCOCH₃ | " | —C₂H₄SO₂NH₂ |
| 76 | " | 3-CH₃ | " | —C₂H₄SO₂NHC₆H₁₁ |
| 77 | " | " | " | —C₂H₄SO₂NHC₆H₅ |
| 78 | " | " | " | —C₂H₄SO₂NHC₂H₄Cl |
| 79 | " | 2-CH₃—5-NHCOCH₃ | —H | —CHC₂H₅<br>     |<br>     CH₃ |
| 80 | " | 3-NHCOCH₃ | —C₂H₅ | —C₂H₄OH |
| 81 | " | " | " | —C₂H₅ |
| 82 | " | " | " | —CH₂CHCH₂OH<br>        |<br>        OH |
| 83 | " | 2-OCH₃—5-NHCOCH₃ | —H | —C₂H₄OH |
| 84 | " | " | —C₂H₄OH | —C₂H₅ |
| 85 | " | " | —C₂H₅ | " |
| 86 | " | " | —C₂H₄NHCOCH₃ | " |
| 87 | " | " | —C₂H₄CONH₂ | " |
| 88 | " | " | CH₃<br>|<br>CH₂CHCH₂OH<br>|<br>CH₃ | " |
| 89 | " | 2-OCH₃—5-CH₃ | —CH₂CH(OH)CH₂OH | —C₃H₇-n |
| 90 | " | " | —CH₂CH₂CH₂CH₃ | —C₂H₅ |
| 91 | " | " | —C₂H₄OC₂H₄OH | " |
| 92 | " | " | C₂H₅ | " |
| 93 | " | " | C₂H₄OH | —C₂H₄OH |
| 94 | " | " | C₂H₅ | —C₂H₄CONH₂ |
| 95 | " | 2,5-di-CH₃ | CHC₂H₅<br>|<br>CH₃ | —H |

TABLE I-continued

| Ex. No. | 3-CONHR$^4$Z, R$^2$, RC— | R$^6$, R$^7$ | R$^8$ | R$^9$ |
|---|---|---|---|---|
| 96 | 3-CONHC$_3$H$_6$OCH$_3$—4-CH$_3$—5-(CH$_3$)$_2$CHC—$\overset{O}{\overset{\|}{}}$ | | C$_2$H$_4$NHCOCH$_3$ | |
| 97 | " | | C$_2$H$_4$CONH$_2$ | |
| 98 | 3-CONHC$_3$H$_6$OCH$_3$—5-(CH$_3$)$_2$CHC—$\overset{O}{\overset{\|}{}}$ | | —CH$_2$CH$_2$NHCOCH$_3$ | —C$_2$H$_5$ |
| 99 | " | 3-CH$_3$ | | " |
| 100 | " | H | | " |
| 101 | " | " | —C$_2$H$_5$ | CH$_2$CH$_2$OH |
| 102 | " | " | " | CH$_2$CH$_2$Cl |
| 103 | " | " | " | CH$_2$CH$_2$Br |
| 104 | " | " | " | CH$_2$CH$_2$CN |
| 105 | " | " | " | CH$_2$CH$_2$NH$_2$ |
| 106 | " | " | " | —C$_2$H$_5$ |
| 107 | " | 3-NHCOCH$_3$ | —CH$_2$CH$_2$CN | CH$_2$CH$_2$OH |
| 108 | " | " | —CH$_2$CH$_2$OH | CH$_2$CH$_2$Cl |
| 109 | " | " | —CH$_2$CH$_2$Cl | CH$_2$CH$_2$SC$_2$H$_5$ |
| 110 | " | 3-CH$_3$ | —C$_2$H$_5$ | CH$_2$CH$_2$CONH$_2$ |
| 111 | " | " | " | " |
| 112 | " | 3-NHCOCH$_3$ | —CH$_2$CH$_2$NHCOCH$_3$ | —C$_2$H$_5$ |
| 113 | " | 3-NHCOOCH$_3$ | —C$_2$H$_5$ | " |
| 114 | " | 3-NHCOCH$_2$OH | H | " |
| 115 | " | 3-NHCOCH$_2$OOCCH$_3$ | | " |
| 116 | " | 3-NHCOCH$_2$CN | | " |
| 117 | " | 3-NHCOCH$_2$CONH$_2$ | | " |
| 118 | " | 3-NHCOC$_6$H$_5$ | —CH$_2$C$_6$H$_5$ | " |
| 119 | " | 3-NHCOC$_6$H$_{11}$ | —CH$_2$CH$_2$CH$_3$ | " |
| 120 | " | 3-NHCOC$_2$H$_5$ | —(CH$_2$)$_3$CH$_3$ | " |
| 121 | " | 2,5-di-Cl | —C$_2$H$_5$ | " |
| 122 | " | 2-CH$_3$—5-OCH$_3$ | H | " |
| 123 | " | 2-OCH$_3$—5-NHCOCH$_3$ | | " |
| 124 | " | 2-CH$_3$ | —C$_2$H$_5$ | " |
| 125 | " | 2-Cl | " | " |
| 126 | " | 2-OCH$_3$ | " | " |

TABLE I-continued

| Ex. No. | 3-CONHR⁴Z, R², RC— $\overset{O}{\underset{\|}{C}}$ — | R⁶, R⁷ | R⁸ | R⁹ |
|---|---|---|---|---|
| 129 | 3-CONHR⁴Z | 3-OCH₃ | —CH₂C₆H₅ | —CH₂C₆H₅ |
| 130 | " | 3-Cl | —C₂H₅ | " |
| 131 | " | 2,5-di-OCH₃ | " | " |
| 132 | " | " | —CH₂C₆H₅ | " |
| 133 | " | " | " | —CH₂CH₂NHCOC₂H₅ |
| 134 | " | 3-NHCOCH₃ | " | —CH₂CH₂NHCOCH=CH₂ |
| 135 | " | " | " | —CH₂CH₂SO₂CH=CH₂ |
| 136 | " | " | " | —CH₂CH₂NHCOCH=CH₂ |
| 137 | " | " | " | —C₂H₅ |
| 138 | " | 2-CH₃—5-NHCOCH₃ | " | —CH₂CH₂CH₃ |
| 139 | " | " | " | —CH₂CH₂OH |
| 140 | " | 2-CH₃—5-NHCOOC₂H₅ | —C₂H₅ | —CH₂CH₂Cl |
| 141 | " | 2-OCH₃—5-NHCOCH₃ | H | —C₂H₅ |
| 142 | " | " | " | —CH₂CH(CH₃)₂ |
| 143 | " | " | " | —CH₂CH₂CN |
| 144 | " | 3-NHCOCH₃ | " | —C₂H₅ |
| 145 | " | 3-CH₃ | —C₂H₅ | " |
| 146 | " | H | —CH₂CH₂CN | " |
| 147 | " | 3-CH₃ | —CH₂CH₂OOCCH₃ | " |
| 148 | " | 3-NHCOCH₃ | —CH₂CH₂OH | " |
| 149 | " | " | —(CH₂)₃NHCOCH₃ | " |
| 150 | " | " | " | " |
| 151 | " | " | " | " |
| 152 | " | 3-CH₃ | —CH₂CH₂NHCOCH₃ | —C₂H₄—N$\begin{array}{c}CO-NH\\ \|\quad\quad\|\\ CO-CH_2\end{array}$CH₂ |
| 153 | " | " | —CH₂CH₂Cl | —C₂H₅ |
| 154 | " | 3-NHCOCH₃ | —CH₂CH₂OH | —C₂H₄—N$\begin{array}{c}COCH_2\\ \diagdown\quad O\\ COCH_2\end{array}$ |
| 155 | " | H | —CH₂CH₂CONH₂ | —C₂H₅ |

TABLE I-continued

Structure:
$R^2-C(=)-C(CONHR^4Z)=C(R)-C(=O)-S$ with azo linkage $N=N$ to phenyl ring bearing $R^6$, $R^7$ and $-N(R^8)(R^9)$ group (with $R^6$, $R^7$ on ring).

| Ex. No. | 3-CONHR$^4$Z, R$^2$, RC(=O)— | R$^6$, R$^7$ | R$^8$ | R$^9$ |
|---|---|---|---|---|
| 156 | 3-CONHR$^4$Z | 3-CH$_3$ | " | benzisothiazole-1,1-dioxide group (−C$_2$H$_4$−N attached to fused ring with C=O and SO$_2$) |
| 157 | " | 3-NHCOCH$_3$ | −CH$_2$CH$_2$OH | −C$_2$H$_5$ |
| 158 | " | H | −CH$_2$CH$_2$OOCCH$_3$ | succinimido (−C$_2$H$_4$−N with CO−S−CO−CH$_2$ ring) |
| 159 | " | 3-CH$_3$ | " | −C$_2$H$_5$ |
| 160 | " | " | −C$_2$H$_5$ | thiadiazole (−C$_2$H$_4$−S−C=N−NH−CH=N ring) |
| 161 | " | 3-NHCOCH$_3$ | " | −C$_2$H$_5$ |
| 162 | " | 3-CH$_3$ | " | pyrrolidino-type (−C$_2$H$_4$−N with CO−CH$_2$−CH$_2$−CH$_2$) |
| 163 | " | " | −H | −C$_2$H$_5$ |
| 164 | " | 2-CH$_3$−5-NHCOCH$_3$ | −H | −CH(C$_2$H$_5$)CH$_3$ |

TABLE I-continued

| Ex. No. | 3-CONHR⁴Z, R², RC(=O)— | R⁶, R⁷ | R⁸ | R⁹ |
|---|---|---|---|---|
| 165 | 3-CONHR⁴Z | 3-NHCOCH₃ | —C₂H₅ | —C₂H₄—N(CO—N—CH₃)(CO—CH₂) (ring) |
| 166 | " | 3-CH₃ | " | —CH₂CH₂CH₂SO₂CH₃ |
| 167 | " | 3-NHCOCH₃ | " | —CH₂CHCH₂OH (with OH) |
| 168 | " | 2-OCH₃—5-NHCOCH₃ | —H | —C₂H₄—N(CO—O)(CO—CH₂) (ring) |
| 169 | " | " | —C₂H₄OH | —C₂H₄OH |
| 170 | " | " | —C₂H₅ | —C₂H₄—N(CO—S)(CO—CH₂) (ring) |
| 171 | " | " | —C₂H₄NHCOCH₃ | —C₂H₄—N(COCH₂O)(CO—CH₂) (ring) |
| 172 | " | " | —C₂H₄CONH₂ | " |
| 173 | " | " | —CH₂CHCH₂OH (with CH₃, CH₃) | —C₃H₇—n |
| 174 | " | " | —CH₂CH(OH)CH₂OH | " |

TABLE I-continued

| Ex. No. | 3-CONHR⁴Z, R², RC— | R⁶, R⁷ | R⁸ | R⁹ |
|---|---|---|---|---|
| 175 | 3-CONHR⁴Z, R², RC— | | —CH₂CH₂CH₂CH₃ | —C₂H₅ |
| 176 | " | | —C₂H₄OC₂H₄OH | " |
| 177 | " | 2-OCH₃—5-CH₃ | —C₂H₅ | —C₂H₄OH |
| 178 | " | " | —C₂H₄OH | " |
| 179 | " | " | —C₂H₅ | —C₂H₄CONH₂ |
| 180 | " | 2,5-di-CH₃ | —CHC₂H₅ / CH₃ | —H |
| 181 | " | " | —C₂H₄NHCOCH₃ | " |
| 182 | " | " | C₂H₄CONH₂ | " |
| 183 | 3-CONHC₂H₄OC₂H₄OH—5-(CH₃)₂CHC— O= | 3-NHCOCH₃ | —CH₂CH₂NHCOCH₃ | —C₂H₅ |
| 184 | " | 3-CH₃ | " | " |
| 185 | " | 3-Br | " | " |
| 186 | " | 3-F | " | " |
| 187 | " | H | —C₂H₅ | " |
| 188 | " | " | —C₂H₄OC₂H₄— | " |
| 189 | " | " | —C₂H₄SO₂C₂H₄— | " |
| 190 | " | " | —C₂H₄SC₂H₄— | " |
| 191 | " | " | —CH₂CH₂CH₂CH₂— | " |
| 192 | " | " | —C₂H₅ | —CH₂CH₂NH₂ |
| 193 | " | 3-CH₃ | —CH₂CH₂CN | —C₂H₅ |
| 194 | " | " | —CH₂CH₂OH | —CH₂CH₂OH |
| 195 | " | " | —CH₂CH₂Cl | —CH₂CH₂Cl |
| 196 | " | " | —C₂H₅ | —CH₂CH₂SC₂H₅ |
| 197 | " | 3-NHCOCH₃ | —CH₂CH₂NHCOCH₃ | —CH₂CH₂CONH₂ |
| 198 | " | " | —C₂H₅ | —C₂H₄—SO₂—SO₂CH₃ |
| 199 | " | " | " | —C₂H₄—SO₂—CH₂CH₂Cl |
| 200 | " | 3-NHCOCH₃ | —H | —C₂H₄—SO₂—CH₂CH₂OH |
| 201 | " | 3-NHCOCH₂OH | " | —C₂H₄—SO₂—CH₂CH₂CN |
| 202 | " | 3-NHCOCH₂OOCCH₃ | | —C₂H₄—SO₂—CH₂— (thiophene) |

TABLE I-continued

| Ex. No. | 3-CONHR⁴Z, R², RC(=O)— | R⁶, R⁷ | R⁸ | R⁹ |
|---|---|---|---|---|
| 203 | 3-CONHR⁴Z | 3-NHCOCH₂CN | | —C₂H₄—SO₂—CH₂—SO₂CH₃ |
| 204 | " | 3-NHCOCH₂CONH₂ | | —C₂H₄—SO₂—CH₂—SCH₃ |
| 205 | " | 3-NHCOC₆H₅ | —CH₂C₆H₅ | —C₂H₄—SO₂—CH₂OOCCH₃ |
| 206 | " | 3-NHCOC₆H₁₁ | —CH₂CH₂CH₃ | —C₂H₄—SO₂—CH₂OCH₃ |
| 207 | " | 3-NHCOC₂H₅ | | —C₂H₄—SO₂—CH₂NH₂ |
| 208 | " | 2,5-di-Cl | —(CH₂)₃CH₃ | —C₂H₄—SO₂—CH₂NHCH₃ |
| 209 | " | 2-CH₃—5-OCH₃ | —C₂H₅ | —C₂H₄—SO₂—CH₂CONHCH₃ |
| 210 | " | 2-OCH₃—5-NHCOCH₃ | H | —C₂H₄—SO₂—CH₂N(CH₃)₂ |
| 211 | " | 2-CH₃ | | —C₂H₄—SO₂—CH₂NHPh |
| 212 | " | 2-Cl | —C₂H₅ | —C₂H₄—SO₂—CH₂Ph |
| 213 | " | 2-OCH₃ | | —C₂H₄—SO₂—CH₂— (furan) |
| 214 | " | 3-OCH₃ | —CH₂C₆H₅ | —C₂H₅ |
| 215 | " | 3-Cl | —C₂H₅ | " |
| 216 | " | 2,5-di-OCH₃ | | " |
| 217 | " | " | | " |
| 218 | " | " | —CH₂C₆H₅ | —CH₂C₆H₅ |
| 219 | " | 3-NHCOCH₃ | | —CH₂CH₂NHCOC₂H₅ |
| 220 | " | " | | —CH₂CH₂SO₂CH=CH₂ |
| 221 | " | " | | —CH₂CH₂NHCOCH=CH₂ |
| 222 | " | " | | —C₂H₅ |
| 223 | " | 2-CH₃—5-NHCOCH₃ | —C₂H₄OC₂H₄CN | —CH₂CH₂CH₃ |
| 224 | " | " | —C₂H₄OC₂H₄OCOCH₃ | —CH₂CH₂CH₃ |
| 225 | " | 2-CH₃—5-NHCOOC₂H₅ | —C₂H₄OCH₂OCH₃ | —CH₂CH₂OH |
| 226 | " | 2-OCH₃—5-NHCOCH₃ | —C₂H₄SO₂NH₂ | —CH₂CH₂Cl |
| 227 | " | " | —C₂H₄SO₂NHCH₃ | —C₂H₅ |
| 228 | " | " | —C₂H₄NHSO₂CH₃ | —CH₂CH(CH₃)₂ |
| 229 | " | " | —C₂H₄NHSO₂Ph | —CH₂CH₂CN |
| 230 | " | " | —C₂H₄NHCOOCH₃ | —C₂H₅ |
| 231 | " | 3-NHCOCH₃ | —CH₂CH₂CN | " |
| 232 | " | 3-CH₃ | —CH₂CH₂OCOCH₃ | " |
| 233 | " | H | —CH₂CH₂OOCCH₃ | " |
| 234 | " | 3-CH₃ | —CH₂CH₂OCOOCH₃ | " |
| 235 | " | " | —CH₂CH₂OCOOCH₃ | " |
| 236 | " | 3-NHCOCH₃ | —(CH₂)₃NHCOCH₃ | " |

TABLE I-continued $3\text{-CONHR}^4Z, R^2, RC(=O)-$ attached to a thiophene ring with $CONHR^4Z$ and $R^2$ substituents; the thiophene connects via $-N=N-$ to a phenyl bearing $R^7, R^6$ and $-NR^8R^9$.

| Ex. No. | 3-CONHR⁴Z, R², RC(=O)— | R⁶, R⁷ | R⁸ | R⁹ |
|---|---|---|---|---|
| 237 | 3-CONHR⁴Z | 3-CH₃ | —CH₂CH₂NHCOCH₃ | —C₂H₄Ph—p-NHCOCH₃ |
| 238 | " | " | —CH₂CH₂Cl | " |
| 239 | " | 3-NHCOCH₃ | —CH₂CH₂OCONHCH₃ | " |
| 240 | " | H | —CH₂CH₂CONH₂ | " |
| 241 | " | 3-CH₃ | —CH₂CH₂OH | " |
| 242 | " | 3-NHCOCH₃ | —CH₂CH₂OOCCH₃ | " |
| 243 | " | H | | —C₂H₄Ph—p-NHCOCH₃ |
| 244 | " | 3-CH₂— (fused benzothiophene) | | |
| 245 | " | 3-CH₃ | —C₂H₅ | —C₂H₄Ph—p-OCH₃ |
| 246 | " | 3-NHCOCH₃ | " | —C₂H₄Ph—p-Cl |
| 247 | " | 3-CH₃ | " | —CH₂Ph—p-CN |
| 248 | " | 3-CH₂Cl | " | —CH₂Ph—p-COOCH₃ |
| 249 | " | 2-CH₃—5-NHCOCH₃ | —H | —CHCH₂Ph / CH₃ |
| 250 | " | 3-NHCOCH₃OC₂H₅ | —C₂H₅ | —C₂H₄OH |
| 251 | " | 3-NHCOCH₂SO₂CH₃ | " | —C₂H₅ |
| 252 | " | 3-NHCOCH₂SCH₃ | " | —CH₂CHCH₂OH / OH |
| 253 | " | 2-OCH₃—5-NHCOCH₃ | —H | —C₂H₄OH |
| 254 | " | 3-NHCONH₂ | —C₂H₄OH | " |
| 255 | " | 3-NHCONHCH₃ | —C₂H₅ | —C₂H₅ |
| 256 | " | 3-NHCON(CH₃)₂ | —C₂H₄NHCOCH₃ | " |
| 257 | " | 3-NHCONH—Ph | —C₂H₄CONH₂ | |

TABLE I-continued

| Ex. No. | 3-CONHR$^4$Z, R$^2$, RC(=O)— | R$^6$, R$^7$ | R$^8$ | R$^9$ |
|---|---|---|---|---|
| 258 | 3-CONHR$^4$Z, R$^2$, RC(=O)— | 3-NHCO— (furan ring) | CH$_3$, —CH$_2$CHCH$_2$OH, CH$_3$ | " |
| 259 | " | 3-NHCO— (thiophene ring) | —CH$_2$CH(OH)CH$_2$OH | —C$_3$H$_7$-n |
| 260 | " | 2-OCH$_3$—5-NHCOCH$_3$ | —CH$_2$CH$_2$CH$_2$CH$_3$ | —C$_2$H$_5$ |
| 261 | " | 2-OCH$_3$—5-CH$_3$ | —C$_2$H$_4$OC$_2$H$_4$OH | " |
| 262 | " | " | —C$_2$H$_5$ | —C$_2$H$_4$OH |
| 263 | " | " | —C$_2$H$_4$OH | —C$_2$H$_4$CONH$_2$ |
| 264 | " | " | —C$_2$H$_5$ | |
| 265 | " | 2,5-di-CH$_3$ | —CHC$_2$H$_5$, CH$_3$ | —H |
| 266 | " | " | —C$_2$H$_4$NHCOCH$_3$ | " |
| 267 | " | " | —C$_2$H$_4$CONH$_2$ | " |
| 268 | 3-CONHC$_2$H$_4$OH—5-(CH$_3$)$_2$CHC(=O)— | 3-CH$_3$ | —C$_2$H$_5$ | —C$_2$H$_5$ |
| 269 | 3-CONHC—CH$_2$OH—5-(CH$_3$)$_2$CHC(=O)—, CH$_3$, CH$_3$ | 3-NHCOOCH$_2$Cl | " | " |
| 270 | 3-CONHC—CH$_2$OH—5-(4-benzoylphenyl)—, CH$_3$, CH$_2$OH | 3-NHCOOCH$_2$OH | " | " |

TABLE I-continued

Structure header:
$R^2$, $R-C(=O)-$, $CONHR^4Z$, with phenyl-N=N-phenyl-N($R^8$)($R^9$), $R^7$, $R^6$ substituents, S linkage

| Ex. No. | 3-CONHR⁴Z, R², RC(=O)— | R⁶, R⁷ | R⁸ | R⁹ |
|---|---|---|---|---|
| 271 | 3-CONHCH₂CHCH₂OH–5–<br>\|<br>OH ; 2-CH₃-benzoyl | 3-NHCOOCH₂–(phenyl) | | |
| 272 | 3-CONHC(CH₂OH)(CH₂OH)–5– ; 3-Cl-benzoyl | 3-NHCOOCH₂CN | " | " |
| 273 | 3-CONHC₂H₄NHCOCH₃–5– ; 3-CH₃O-benzoyl | 3-NHCOOCH₂–(thienyl) | " | " |
| 274 | 3-CONHC₂H₄OC₂H₄OH–4–CH₃–5–(CH₃)₂CHC(=O)– | 3-NHCOOCH₂SO₂CH₃ | " | " |
| 275 | 3-CONHC₃H₆Cl₃–5–(CH₃)₂CHC(=O)– | 3-NHCOOCH₂SCH₃ | —C₂H₄—S—C₂H₄OH | " |
| 276 | 3-CONCH₂–5-(CH₃)₂CHC(=O)–(furyl) | 3-NHCOOCH₂OCOCH₃ | —C₂H₄—S—Ph | " |

TABLE I-continued $$\text{structure with } R^2, R\text{-}C(=O)\text{-}S, CONHR^4Z, N=N, \text{aryl with } R^6, R^7, N(R^8)(R^9)$$

| Ex. No. | 3-CONHR⁴Z, R², RC(=O)- | R⁶, R⁷ | R⁸ | R⁹ |
|---|---|---|---|---|
| 277 | 3-CONHC₂H₄-N(-CH₂-CH₂-)(-C(=O)-CH₂-)-5-(CH₃)₂CHC(=O)- | 3-NHCOOCH₂OCH₃ | —C₂H₄—S—Ph—p-Cl | " |
| 278 | 3-CONHC₂H₄OC₂H₅-5-(CH₃)₂CHC(=O)- | 3-NHSO₂CH₃ | —C₂H₄—S—Ph—p-CH₃ | " |
| 279 | 3-CONHC₂H₄CN-5-(CH₃)₂CHC(=O)- | 3-NHSO₂CH₂Cl | —C₂H₄—S—Ph—p-OCH₃ | " |
| 280 | 3-CONHC₂H₄CONHCH₃-5-(CH₃)₂CHC(=O)- | 3-NHSO₂CH₂OH | —C₂H₄—S—Ph—p-NHCOCH₃ | " |
| 281 | 3-CONHC₂H₄OCCH₃-5-(CH₃)₂CHC(=O)- | 3-NHSO₂CH₂-Ph | —C₂H₄—S—Ph—p-CN | " |
| 282 | 3-CONHC₂H₄COOCH₃-5-(CH₃)₂CHC(=O)- | 3-NHSO₂CH₂-(thienyl) | —C₂H₄—S—Ph—p-COOCH₃ | " |
| 283 | 3-CONHC₂H₄SCH₃-5-CH₃C(=O)- | 3-NHSO₂CH₂SO₂CH₃ | —C₂H₅ | —CH₂CCH₂OH(OH) |
| 284 | 3-CONHC(CH₃)(CH₃)—CH₂OH-5-CH₃C(=O)- | | | " |

TABLE I-continued $$R^2-C(=O)-... \text{(structure with CONHR}^4Z, R^2, R-C(=O)-, N=N, S, \text{phenyl with } R^6, R^7, NR^8R^9\text{)}$$

| Ex. No. | 3-CONHR⁴Z, R², RC(=O)— | R⁶, R⁷ | R⁸ | R⁹ |
|---|---|---|---|---|
| 285 | 3-CONHC(CH₃)(CH₂OH)—5-CH₃C(=O)— | 3-NHSO₂CH₂SCH₃ | " | " |
| 286 | 3-CONHCH₂CHCH₂OH(OH)—5-CH₃C(=O)— | 3-NHSO₂CH₂OCOCH₃ | " | " |
| 287 | 3-CONHC(CH₂OH)(CH₂OH)—5-CH₃C(=O)— | 3-NHSO₂CH₃ | " | " |
| 288 | 3-CONHC₂H₄NHCH₃—5-CH₃C(=O)— | 3-CH₃ | " | " |
| 289 | 3-CONHC₂H₄OC₂H₄OH—5-CH₃C(=O)— | " | " | " |
| 290 | 3-CONHC₃H₆SO₂CH₃—5-CH₃C(=O)— | " | " | " |
| 291 | 3-CONHCH₂—(furan)—5-CH₃C(=O)— | " | " | " |

TABLE I-continued

| Ex. No. | 3-CONHR⁴Z, R², RC(=O)— | R⁶, R⁷ | R⁸ | R⁹ |
|---|---|---|---|---|
| 292 | 3-CONHC₂H₄—N(—C(=O)—CH₂—CH₂—CH₂—) (succinimide) | | —C₂H₄CONH₂ | —C₂H₅ |
| 293 | 3-CONHC₂H₄OH—5-CH₃CH₂C(=O)— | " | " | " |
| 294 | 3-CONHC(CH₃)₂—CH₂OH—5-CH₃CH₂C(=O)— | " | " | " |
| 295 | 3-CONHC(CH₃)(CH₂OH)—CH₂OH—5-(CH₂)₂CHCH₂C(=O)— | " | " | " |
| 296 | 3-CONHCH₂CHCH₂OH(OH)—5-(CH₃)₂CHCH₂C(=O)— | " | " | " |
| 297 | 3-CONHC(CH₂OH)(CH₂OH)—CH₂OH—5-(CH₃)₂CHCH₂C(=O)— | " | " | " |
| 298 | 3-CONHC₂H₄NHCOCH₃—5-(CH₃)₂CHCH₂C(=O)— | " | " | " |
| 299 | 3-CONHC₂H₄OC₂H₄OH—5-CH₃CH₂C(=O)— | " | " | " |

TABLE I-continued $$\underset{\text{R-C}}{\overset{\text{R}^2}{\underset{\text{O}}{\bigg|}}}\overset{\text{CONHR}^4Z}{\underset{\text{S}}{\bigg|}}\text{N=N}\text{—}\underset{\text{R}^6}{\overset{\text{R}^7}{\bigg\langle}}\text{N}\overset{\text{R}^8}{\underset{\text{R}^9}{\bigg\langle}}$$

| Ex. No. | CONHR⁴Z, R², RC— | | R⁶, R⁷ | R⁸ | R⁹ |
|---|---|---|---|---|---|
| 300 | 3-CONHR⁴Z, R², RC— (3-CONHC₃H₆OCH₃—5-(CH₃)₂CHCH₂C—, O=) | | " | " | " |
| 301 | 3-CONHCH₂— (furan) | 5-(CH₃)₂CHCH₂C—, O= | " | " | " |
| 302 | 3-CONHC₂H₄—N(CH₂CH₂)₂C=O (morpholine) | 5-n-C₄H₉C—, O= | " | " | " |
| 303 | 3-CONHC₂H₄OC₂H₄OC₂H₅—5-(CH₃)₂CHCH₂C—, O= | | " | " | " |
| 304 | 3-CONHC₂H₄CN—5-(CH₃)₂CHCH₂C—, O= | | " | —C₂H₅ | —C₂H₄CN |
| 305 | 3-CONHC₂H₄CONH₂—5-(CH₃)₂CHC—, O= | | " | " | " |
| 306 | 3-CONHC₂H₄OCCH₃—5-(CH₃)₂CHC—, O= | | " | " | " |
| 307 | 3-CONHC₂H₄COOCH₃—5-(CH₃)₂CHC—, O= | | " | " | " |
| 308 | 3-CONHC₂H₄OH—5-CH₃C—, O= | | " | " | " |

TABLE I-continued
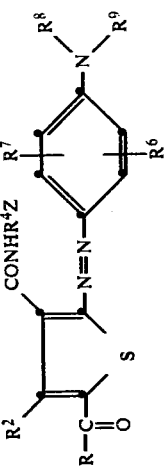
| Ex. No. | 3-CONHR⁴Z, R², RC— | R⁶, R⁷ | R⁸ | R⁹ |
|---|---|---|---|---|
| 309 | 3-CONHC—CH₂OH—5-CH₃C—, CH₃/CH₃, O= | " | " | " |
| 310 | 3-CONHC—CH₂OH—5-CH₃C—, CH₃/CH₂OH, O= | " | " | " |
| 311 | 3-CONHCH₂CHCH₂OH, OH; —5-CH₃C—, O= | " | " | " |
| 312 | 3-CONHC—CH₂OH—5-CH₃C—, CH₂OH/CH₂OH, O= | " | " | —C₂H₅OCH₃ |
| 313 | 3-CONHC₂H₄NHCOCH₃—5-CH₃C—, O= | " | " | " |
| 314 | 3-CONHC₂H₄OC₂H₄OH—5-CH₃C—, O= | " | " | " |
| 315 | 3-CONHC₃H₆OCH₃—5-CH₃C—, O= | " | " | " |
| 316 | 3-CONHCH₂—[furan]—5-CH₃C—, O= | " | " | " |

TABLE I-continued

[Structure: R²-C(=N-N=...)-...CONHR⁴Z group with aryl-N(R⁸)(R⁹), R⁶, R⁷ substituents on phenyl ring, and thiazolone-like ring with S, C=O]

| Ex. No. | 3-CONHR⁴Z, R², RC(=O)— | R⁶, R⁷ | R⁸ | R⁹ |
|---|---|---|---|---|
| 317 | 3-CONHR⁴Z, R², RC(=O)—  [where group includes 3-CONHC₂H₄—N with cyclic imide CH₂CH₂C(=O)] | " | " | " |
| 318 | 3-CONHC₂H₄OH—5-(CH₃)₂CHC(=O)— | " | —CH₂CH(OH)CH₂OH | —C₂H₅ |
| 319 | 3-CONHC(CH₃)₂—CH₂OH—5-(CH₃)₂CHC(=O)— | [thiophene ring, 2-S] | " | " |
| 320 | 3-CONHC(CH₃)—CH₂OH(CH₂OH)—5-(CH₃)₂CHC(=O)— | [phenyl, 2-O] | " | " |
| 321 | 3-CONHC₂H₄CHCH₂OH(OH)—5-(CH₃)₂CHC(=O)— | 3-SC₂H₅ | " | " |
| 322 | 3-CONHC(CH₂OH)—CH₂OH(CH₂OH)—5-(CH₃)₂CHC(=O)— | [phenyl, 2-S] | " | " |
| 323 | 3-CONHC₂H₄NHCOCH₃—5-(CH₃)₂CHC(=O)— | 3-CH₃ | " | " |

TABLE I-continued $$\text{R}^2\text{-C(=O)-S-C(CONHR}^4\text{Z)=C(R)-N=N-C}_6\text{H}_3(\text{R}^6)(\text{R}^7)\text{-NR}^8\text{R}^9$$

| Ex. No. | 3-CONHR⁴Z, R², RC(=O)— | R⁶, R⁷ | R⁸ | R⁹ |
|---|---|---|---|---|
| 324 | 3-CONHR⁴Z, R², RC(=O)— | | —C₆H₄—p-Cl | " |
| 325 | 3-CONHC₂H₄OC₂H₄OH—5-(CH₃)₂CHC(=O)— | | —C₆H₅ | —C₂H₄OH |
| 326 | 3-CONHC₃H₆OCH₃—5-(CH₃)₂CHC(=O)— | | " | —C₂H₄CONH₂ |
| 327 | 3-CONHCH₂-(furan)-5-(CH₃)₂CHC(=O)— | | " | —C₃H₆CONH₂ |
| 327 | 3-CONHC₂H₄—N(CH₂CH₂)(CH₂-C(=O))—5-(CH₃)₂CHC(=O)— | | " | |
| 328 | 3-CONHC₂H₄OC₂H₄OC₂H₅—5-(CH₃)₂CHC(=O)— | | —C₂H₅ | —CH₂CHCH₂CN, CN |
| 329 | 3-CONHC₂H₄CN—5-(CH₃)₂CHC(=O)— | | " | —CH₂CHCH₂CONH₂, CONH₂ |
| 330 | 3-CONHC₂H₄CONH₂—5-(CH₃)₂CHC(=O)— | | " | —CH₂CHCH₂OCH₃, OCH₃ |
| 331 | 3-CONHC₂H₄OCH₃—5-(CH₃)₂CHC(=O)— | | " | —C₆H₄—p-OCH₃ |
| 332 | 3-CONHC₂H₄COOCH₃—5-(CH₃)₂CHC(=O)— | | " | —CH₂CHCH₂OC₆H₅, OC₆H₅ |

TABLE I-continued $$\text{R}^2\text{-C(=O)-S-C(CONHR}^4\text{Z)=N-N=C}_6\text{H}_2(\text{R}^6)(\text{R}^7)\text{-N(R}^8)(\text{R}^9)$$

| Ex. No. | 3-CONHR⁴Z, R², RC(=O)— | R⁶, R⁷ | R⁸ | R⁹ |
|---|---|---|---|---|
| 333 | 3-CONHC₂H₄OH—5-CH₃C(=O)— | " | —C₂H₄—N(CO—CH₂)(CO—CH₂) (succinimide) | —CH₂CHCH₂SCH₃ <br> SCH₃ |
| 334 | 3-CONHC(CH₃)₂—CH₂OH—5-CH₃C(=O)— | " | " | —CH₂CHCH₂S—C(=N—NH—CH=N)—N=C(SCH)—S (bis-triazole thioether) |
| 335 | 3-CONHC(CH₃)(CH₂OH)—5-CH₃C(=O)— | " | —C₂H₅ | pyridyl-2-thio-C₂H₄S— |
| 336 | 3-CONHCH₂CHCH₂OH—5-CH₃C(=O)— <br> OH | " | " | pyridyl-2-oxy-C₂H₄S— |

TABLE I-continued

| Ex. No. | 3-CONHR⁴Z, R², RC(=O)- | R⁶, R⁷ | R⁸ | R⁹ |
|---|---|---|---|---|
| 337 | 3-CONHC(CH₂OH)(CH₂OH)—5-CH₃C(=O)— | " | " | aryl group with $-N=C(-C_2H_4S-)-NH-$ (benzimidazole-like) |
| 338 | 3-CONHC₂H₄NHCOCH₃—5-CH₃C(=O)— | " | " | pyridyl-$-C_2H_4S-$ |
| 339 | 3-CONHC₂H₄OC₂H₄OH—5-CH₃C(=O)— | " | " | pyridyl-$-C_2H_4S-$ |
| 340 | 3-CONHC₃H₆OCH₃—5-CH₃C(=O)— | " | " | triazole with $N-C_2H_4CH$, $-C_2H_4S-$ |
| 341 | 3-CONHCH₂-(furan-5-CH₃C(=O)-) | " | " | oxadiazole with $N-C_2H_4CN$, $-OH$, $-C_2H_4S-$ |

TABLE I-continued

| Ex. No. | 3-CONHR⁴Z, R², RC— | R⁶, R⁷ | R⁸ | R⁹ |
|---|---|---|---|---|
| 342 | 3-CONHC₂H₄—N(CO—CH₂—S—CH₃C=O)(CH₂—CH₂) | " | " | —C₂H₄S—C(=N—N=CH—N—CH₂CH₂OC₂H₅) |

TABLE II

Structure with substituents: $R^2$, $CONHR^4Z$, $R^{12}$, $R^{16}$, $R^{11}$, $R^{10}$, $R^6$, $R^8$, with $RC(=O)$ group on thiophene (S) ring connected via $N=N$ to bicyclic system containing N.

| Ex. No. | 3-CONHR⁴Z, R², RC(=O)— | R⁶, R¹⁰, R¹¹, R¹², R¹⁶ | R⁸ |
|---|---|---|---|
| 343 | 3-CONHC₂H₄OH—5-(CH₃)₂CHC(=O)— | 2,7-di-CH₃ | —C₂H₄OH |
| 344 | " | " | —CH₂CH(OH)CH₂OH |
| 345 | " | " | —C₂H₄CONH₂ |
| 346 | " | 2,5-di-CH₃—8-OCH₃ | —C₂H₄OH |
| 347 | " | 2,2,4,7-tetra-CH₃ | " |
| 348 | 3-CONHC₃H₆OCH₃—5-(CH₃)₂CHC(=O)— | 2,7-di-CH₃ | " |
| 349 | " | " | —CH₂CH(OH)CH₂OH |
| 350 | " | " | —C₂H₄CONH₂ |
| 351 | " | 2,5-di-CH₃—8-OCH₃ | —C₂H₄OH |
| 352 | " | 2,2,4,7-tetra-CH₃ | " |
| 353 | 3-CONHC₂H₄OC₂H₄OH—5-(CH₃)₂CHC(=O)— | 2,7-di-CH₃ | " |
| 354 | " | " | —CH₂CH(OH)CH₂OH |
| 355 | " | " | —C₂H₄CONH₂ |
| 356 | " | 2,5-di-CH₃—8-OCH₃ | —C₂H₄OH |
| 357 | " | 2,2,4,7-tetra-CH₃ | " |
| 358 | 3-CONHC₂H₄OH—5-(CH₃)₂CHC(=O)— | 2,2,4-tri-CH₃ | —CH₂CH₂CONH₂ |
| 359 | " | 2,2,4-tri-CH₃ | —CH₂CH₂NHCOCH₃ |
| 360 | " | 2,2,4-tri-CH₃ | —CH₂CH₂OH |
| 361 | " | 2,2,4-tri-CH₃ | —CH₂CH₂CN |
| 362 | 3-CONHC₂H₄NHCHO—5-(CH₃)₂CHC(=O)— | 2-CH₃—7-NHCOCH₃ | —C₂H₅ |
| 363 | " | 2,2,4-tri-CH₃—7-NHCOCH₃ | —CH₂CH₂CONH₂ |
| 364 | " | 2,2,4,7-tetra-CH₃ | —C₂H₅ |
| 365 | 3-CONHC₂H₄OH—5-(CH₃)₂CHC(=O)— | 2,2,4,7-tetra-CH₃ | —CH₂CH₂Cl |
| 366 | " | 2,2,4,7-tetra-CH₃ | —CH₂CH₂OOCC₂H₅ |
| 367 | " | 2,2,4,7-tetra-CH₃ | —CH₂CH₂OC₂H₅ |
| 368 | " | 2,7-di-CH₃ | —CH₂CH₂CONH₂ |
| 369 | " | 2,2,4,7-tetra-CH₃ | —CH₂CH₂CONHC₂H₅ |
| 370 | " | 2,2,4,7-tetra-CH₃ | —CH₂CH₂CONH(CH₂)₃CH₃ |
| 371 | " | 2,2,4,7-tetra-CH₃ | —CH₂CH₂CON(C₂H₅)₂ |
| 372 | " | 2,2,4,7-tetra-CH₃ | —CH₂CH₂CONHCH₂C₆H₅ |
| 373 | " | 2,2,4,7-tetra-CH₃ | —CH₂CH₂OOCOC₂H₅ |
| 374 | " | 2,2,4,7-tetra-CH₃ | —CH₂CH₂CONH₂ |
| 375 | " | 2,2,4,7-tetra-CH₃ | —CH₂CH₂NCOCH₂CH₂CO |
| 376 | " | 2-CH(CH₃)₂—7-NHCOCH₃ | —C₂H₅ |
| 377 | " | 7-CH₃ | —CH₂CH₂NHCOCH₃ |
| 378 | " | 2,7-di-CH₃ | —CH₂CH₂CONH₂ |

TABLE II-continued

| Ex. No. | 3-CONHR⁴Z, R², RC(=O)— | R⁶, R¹⁰, R¹¹, R¹², R¹⁶ | R⁸ |
|---|---|---|---|
| 379 | " | 2,7-di-CH₃ | —CH₂CH₂Br |
| 380 | " | 7-CH₃ | —CH₂CH₂NHC(=O)CH=CH₂ |
| 381 | " | 2,2,4,7-tetra-CH₃ | —C₂H₅ |
| 382 | " | 2,2,4,7-tetra-CH₃ | —CH₂CH₂NHCOCH₃ |
| 383 | " | 2,2,4,7-tetra-CH₃ | —CH₂CH₂OH |
| 384 | " | 2,2,4,7-tetra-CH₃ | —CH₂CH₂OOCCH₃ |
| 385 | " | 2,2,4-tri-CH₃—7-NHCOCH₃ | —C₂H₅ |
| 386 | " | 2,2,4-tri-CH₃—7-NHCOCH₃ | —CH₂CH₂CONH₂ |
| 387 | " | 2,2,4-tri-CH₃—7-NHCOCH₃ | —CH₂CH₂OH |
| 388 | " | 2,2,4-tri-CH₃—7-NHCOCH₃ | —CH₂C₆H₅ |
| 389 | " | " | —C₂H₄CONHCH₂OH |
| 390 | " | " | —CH₂CH(OH)CH₂OH |
| 391 | " | " | —C₃H₆NHC(=O)NHC₂H₅ |
| 392 | " | " | —C₂H₅ |
| 393 | " | 3-CN, 7-CH₃ | —C₂H₅ |
| 394 | " | 3-CONH₂, 7-CH₃ | —C₂H₅ |
| 395 | " | 3-Cl, 7-CH₃ | —C₂H₄NHCOCH₃ |
| 396 | " | 3-OCH₃, 7-CH₃ | —CH(CH₃)₂ |
| 397 | " | 2-CH(CH₃)₂—7-CH₃ | —C₂H₄OH |
| 398 | " | 2,4,7-tri-CH₃ | " |
| 399 | " | 7-CH₃ | " |
| 400 | " | 3-hydroxy-7-CH₃ | —C₂H₅ |
| 401 | " | " | —C₄H₉—n |
| 402 | " | 2,2,4-tri-CH₃—7-NHCOC₂H₅ | —C₂H₅ |
| 403 | " | 5,7-di-CH₃ | —CH₂CHOHCH₂OH |
| 404 | " | 2,2,4-di-CH₃—5,8-di-OCH₃ | —H |
| 405 | " | 2,2,4-tri-CH₃ | —C₂H₅ |
| 406 | " | 2,2,4-tri-CH₃—8-OCH₃ | —C₂H₅ |
| 407 | " | " | —C₂H₄CN |
| 408 | " | 2,7-di-CH₃ | —CH₂C₆H₅ |
| 409 | " | " | —CH₂CH₂OCH₃ |
| 410 | " | " | —CH₂CH₂Oφ |
| 411 | " | " | —CH₂CH₂COOCH₃ |
| 412 | " | " | —CH₂CH₂SO₂NH₂ |
| 413 | " | " | —CH₂CH₂SO₂NHC₂H₅ |
| 414 | " | " | —CH₂CH₂CH₂SO₂CH₃ |
| 415 | " | " | —CH₂CH₂SCH₃ |
| 416 | " | " | —CH₂CH₂S—C(benzothiazol-2-yl) |
| 417 | " | " | —CH₂CH₂—S—C(1,2,4-triazol-3-yl) |
| 418 | " | " | —CH₂CH₂N(COCH₂)₂ (succinimido) |

TABLE II-continued

| Ex. No. | 3-CONHR⁴Z, R², RC(=O)— | R⁶, R¹⁰, R¹¹, R¹², R¹⁶ | R⁸ |
|---|---|---|---|
| 419 | 3-CONHC₃H₆OCH₃—5-(CH₃)₂CHC(=O)— | 2,2,4-tri-CH₃ | —CH₂CH₂CONH₂ |
| 420 | " | 2,2,4-tri-CH₃ | —CH₂CH₂NHCOCH₃ |
| 421 | " | 2,2,4-tri-CH₃ | —CH₂CH₂OH |
| 422 | " | 2,2,4-tri-CH₃ | —CH₂CH₂CN |
| 423 | " | 2-CH₃—7-NHCOCH₃ | —C₂H₅ |
| 424 | " | 2,2,4-tri-CH₃—7-NHCOCH₃ | —CH₂CH₂CONH₂ |
| 425 | " | 2,2,4,7-tetra-CH₃ | —C₂H₅ |
| 426 | " | 2,2,4,7-tetra-CH₃ | —CH₂CH₂Cl |
| 427 | " | 2,2,4,7-tetra-CH₃ | —CH₂CH₂OOCC₂H₅ |
| 428 | " | 2,2,4,7-tetra-CH₃ | —CH₂CH₂OC₂H₅ |
| 429 | " | 2,7-di-CH₃ | —CH₂CH₂CONH₂ |
| 430 | " | 2,2,4,7-tetra-CH₃ | —CH₂CH₂CONHC₂H₅ |
| 431 | " | 2,2,4,7-tetra-CH₃ | —CH₂CH₂CONH(CH₂)₃CH₃ |
| 432 | " | 2,2,4,7-tetra-CH₃ | —CH₂CH₂CON(C₂H₅)₂ |
| 433 | " | 2,2,4,7-tetra-CH₃ | —CH₂CH₂CONHCH₂C₆H₅ |
| 434 | " | 2,2,4,7-tetra-CH₃ | —CH₂CH₂OOCOC₂H₅ |
| 435 | " | 2,2,4,7-tetra-CH₃ | —CH₂CH₂CONH₂ |
| 436 | " | 2,2,4,7-tetra-CH₃ | —CH₂CH₂NCOCH₂CH₂CO |
| 437 | " | 2-CH(CH₃)₂—7-NHCOCH₃ | —C₂H₅ |
| 438 | " | 7-CH₃ | —CH₂CH₂NHCOCH₃ |
| 439 | " | 2,7-di-CH₃ | —CH₂CH₂CONH₂ |
| 440 | " | 2,7-di-CH₃ | —CH₂CH₂Br |
| 441 | " | 7-CH₃ | —CH₂CH₂NHC(=O)CH=CH₂ |
| 442 | " | 2,2,4,7-tetra-CH₃ | —C₂H₅ |
| 443 | " | 2,2,4,7-tetra-CH₃ | —CH₂CH₂NHCOCH₃ |
| 444 | " | 2,2,4,7-tetra-CH₃ | —CH₂CH₂OH |
| 445 | " | 2,2,4,7-tetra-CH₃ | —CH₂CH₂OOCCH₃ |
| 446 | " | 2,2,4-tri-CH₃—7-NHCOCH₃ | —C₂H₅ |
| 447 | " | 2,2,4-tri-CH₃—7-NHCOCH₃ | —CH₂CH₂CONH₂ |
| 448 | " | 2,2,4-tri-CH₃—7-NHCOCH₃ | —CH₂CH₂OH |
| 449 | " | 2,2,4-tri-CH₃—7-NHCOCH₃ | —CH₂C₆H₅ |
| 450 | " | " | —C₂H₄CONHCH₂OH |
| 451 | " | " | —CH₂CH(OH)CH₂OH |
| 452 | " | " | —C₃H₆NHC(=O)NHC₂H₅ |
| 453 | " | " | —C₂H₅ |
| 454 | " | 2,2,4-tri-CH₃—7-NHCOCH₃ | —C₂H₅ |
| 455 | " | " | —C₂H₅ |
| 456 | " | " | —C₂H₄NHCOCH₃ |
| 457 | " | " | —CH(CH₃)₂ |
| 458 | " | 2-CH(CH₃)₂—7-CH₃ | —C₂H₄OH |
| 459 | " | 2,4,7-tri-CH₃ | " |
| 460 | " | 7-CH₃ | " |
| 461 | " | 3-hydroxy-7-CH₃ | —C₂H₅ |
| 462 | " | " | —C₄H₉-n |
| 463 | " | 2,2,4-tri-CH₃—7-NHCOC₂H₅ | —C₂H₅ |
| 464 | " | 5,7-di-CH₃ | —CH₂CHOHCH₂OH |
| 465 | " | 2,2,4-di-CH₃—5,8-di-OCH₃ | —H |
| 466 | " | 2,2,4-tri-CH₃ | —C₂H₅ |
| 467 | " | 2,2,4-tri-CH₃—8-OCH₃ | —C₂H₅ |
| 468 | " | " | —C₂H₄CN |
| 469 | " | 2,7-di-CH₃ | —CH₂C₆H₅ |
| 470 | " | " | —CH₂CH₂OCH₃ |
| 471 | " | " | —CH₂CH₂OC₆H₅ |

TABLE II-continued

| Ex. No. | 3-CONHR⁴Z, R², RC(=O)— | R⁶, R¹⁰, R¹¹, R¹², R¹⁶ | R⁸ |
|---|---|---|---|
| 472 | " | " | —CH₂CH₂COOCH₃ |
| 473 | " | " | —CH₂CH₂SO₂NH₂ |
| 474 | " | " | —CH₂CH₂SO₂NHC₂H₅ |
| 475 | " | " | —CH₂CH₂CH₂SO₂CH₃ |
| 476 | " | " | —CH₂CH₂SCH₃ |
| 477 | " | " | —CH₂CH₂S—C(benzothiazol-2-yl) |
| 478 | " | " | —CH₂CH₂—S—C(1,2,4-triazol-3-yl) |
| 479 | " | " | —CH₂CH₂N(COCH₂)₂ (succinimido) |
| 480 | 3-CONHC₂H₄OC₂H₄OH—5-(CH₃)₂CHC(=O)— | 2,2,4-tri-CH₃ | —CH₂CH₂CONH₂ |
| 481 | " | 2,2,4-tri-CH₃ | —CH₂CH₂NHCOCH₃ |
| 482 | " | 2,2,4-tri-CH₃ | —CH₂CH₂OH |
| 483 | " | 2,2,4-tri-CH₃ | —CH₂CH₂CN |
| 484 | " | 2-CH₃—7-NHCOCH₃ | —C₂H₅ |
| 485 | " | 2,2,4-tri-CH₃—7-NHCOCH₃ | —CH₂CH₂CONH₂ |
| 486 | " | 2,2,4,7-tetra-CH₃ | —C₂H₅ |
| 487 | " | 2,2,4,7-tetra-CH₃ | —CH₂CH₂Cl |
| 488 | " | 2,2,4,7-tetra-CH₃ | —CH₂CH₂OOCC₂H₅ |
| 489 | " | 2,2,4,7-tetra-CH₃ | —CH₂CH₂OC₂H₅ |
| 490 | " | 2,7-di-CH₃ | —CH₂CH₂CONH₂ |
| 491 | " | 2,2,4,7-tetra-CH₃ | —CH₂CH₂CONHC₂H₅ |
| 492 | " | 2,2,4,7-tetra-CH₃ | —CH₂CH₂CONH(CH₂)₃CH₃ |
| 493 | " | 2,2,4,7-tetra-CH₃ | —CH₂CH₂CON(C₂H₅)₂ |
| 494 | " | 2,2,4,7-tetra-CH₃ | —CH₂CH₂CONHCH₂C₆H₅ |
| 495 | " | 2,2,4,7-tetra-CH₃ | —CH₂CH₂OOCOC₂H₅ |
| 496 | " | 2,2,4,7-tetra-CH₃ | —CH₂CH₂CONH₂ |
| 497 | " | 2,2,4,7-tetra-CH₃ | —CH₂CH₂NCOCH₂CH₂CO (succinimido) |
| 498 | " | 2-CH(CH₃)₂—7-NHCOCH₃ | —C₂H₅ |
| 499 | " | 7-CH₃ | —CH₂CH₂NHCOCH₃ |
| 500 | " | 2,7-di-CH₃ | —CH₂CH₂CONH₂ |
| 501 | " | 2,7-di-CH₃ | —CH₂CH₂Br |
| 502 | " | 7-CH₃ | —C₂H₄SO₂C₂H₄OH |
| 503 | " | 2,2,4,7-tetra-CH₃ | —C₂H₅ |
| 504 | " | 2,2,4,7-tetra-CH₃ | —CH₂CH₂NHCOCH₃ |
| 505 | " | 2,2,4,7-tetra-CH₃ | —CH₂CH₂OH |
| 506 | " | 2,2,4,7-tetra-CH₃ | —CH₂CH₂NHCHO |
| 507 | " | 2,2,4-tri-CH₃—7-NHCOCH₃ | —C₂H₅ |
| 508 | " | 2,2,4-tri-CH₃—7-NHCOCH₃ | —CH₂CH₂CONH₂ |
| 509 | " | 2,2,4-tri-CH₃—7-NHCHO | —CH₂CH₂OH |
| 510 | " | 2,2,4-tri-CH₃—7-NHCOCH₃ | —CH₂C₆H₅ |
| 511 | " | " | —C₂H₄CONHCH₂OH |

TABLE II-continued

Structure:
R²–C(=O)–[thiophene with CONHR⁴Z, R², RC(O)–]–N=N–[phenyl with R⁶]–[fused ring with R¹², R¹⁶, R¹¹, R¹⁰, N-R⁸]

| Ex. No. | 3-CONHR⁴Z, R², RC(O)— | R⁶, R¹⁰, R¹¹, R¹², R¹⁶ | R⁸ |
|---|---|---|---|
| 512 | " | " | —CH₂CH(OH)CH₂OH |
| 513 | " | " | —C₃H₆NHC(O)NHC₂H₅ |
| 514 | " | " | —C₂H₅ |
| 515 | " | 2,2,4-tri-CH₃—7-NHCOCH₃ | —C₂H₅ |
| 516 | " | " | —C₂H₅ |
| 517 | " | " | —C₂H₄NHCOCH₃ |
| 518 | " | " | —CH(CH₃)₂ |
| 519 | " | 2-CH(CH₃)₂—7-CH₃ | —C₂H₄OH |
| 520 | " | 2,4,7-tri-CH₃ | " |
| 521 | " | 7-CH₃ | " |
| 522 | " | 3-hydroxy-7-CH₃ | —C₂H₅ |
| 523 | " | 3-hydroxy-7-CH₃ | —C₄H₉—n |
| 524 | " | 2,2,4-tri-CH₃—7-NHCOC₂H₅ | —C₂H₅ |
| 525 | " | 5,7-di-CH₃ | —CH₂CHOHCH₂OH |
| 526 | " | 2,2,4-di-CH₃—5,8-di-OCH₃ | —H |
| 527 | " | 2,2,4-tri-CH₃ | —C₂H₅ |
| 528 | " | 2,2,4-tri-CH₃—8-OCH₃ | —C₂H₅ |
| 529 | " | " | —C₂H₄CN |
| 530 | " | 2,7-di-CH₃ | —CH₂φ |
| 531 | " | " | —CH₂CH₂OCH₃ |
| 532 | " | " | —CH₂CH₂Oφ |
| 533 | " | " | —CH₂CH₂COOCH₃ |
| 534 | " | " | —CH₂CH₂SO₂NH₂ |
| 535 | " | " | —CH₂CH₂SO₂NHC₂H₅ |
| 536 | " | " | —CH₂CH₂CH₂SO₂CH₃ |
| 537 | " | " | —CH₂CH₂SCH₃ |
| 538 | " | " | —CH₂CH₂—S—(benzoxazol-2-yl) |
| 539 | " | " | —CH₂CH₂—S—(1-(2-hydroxyethyl)-1,2,4-triazol-3-yl) |
| 540 | " | " | —N(hydantoinyl, 3-methyl) (CH₂ linker) |
| 541 | 3-CONHC₂H₄OH—5-(CH₃)₂CHC(O)— | " | —C₂H₄OH |
| 542 | 3-CONHC(CH₃)₂CH₂OH—5-(CH₃)₂CHC(O)— | " | —CH₂CH₂—N(hydantoinyl) |

TABLE II-continued

| Ex. No. | 3-CONHR⁴Z, R², RCO— | R⁶, R¹⁰, R¹¹, R¹², R¹⁶ | R⁸ |
|---|---|---|---|
| 543 | 3-CONHC(CH₃)(CH₂OH)(CH₂OH)—5-(4-benzoyl) | | —CH₂CH₂—N(CO—S—CH₂)(CO) (thiazolidinedione) |
| 544 | 3-CONHCH₂CH(OH)CH₂OH—5-(2-methylbenzoyl) | " | —CH₂CH₂—N(CO—CH₂—O—CH₂—CO) (morpholinedione) |
| 545 | 3-CONHC(CH₂OH)(CH₂OH)(CH₂OH)—5-(2-chlorobenzoyl) | " | —CH₂CH₂—S—(1,2,4-triazol-3-yl) |
| 546 | 3-CONHC₂H₄NHCOCH₃—5-(2-methoxybenzoyl) | " | —CH₂CH₂—N(CO—C₆H₄—CH₂) (isoindolinone) |
| 547 | 3-CONHC₂H₄OC₂H₄OH—4-CH₃—5-(CH₃)₂CHCO— | " | —C₂H₄OH |
| 548 | 3-CONHC₃H₆Cl—5-(CH₃)₂CHCO— | " | —CH₂CH₂—N(CO—C₆H₄—SO₂) (benzisothiazoledione) |
| 549 | 3-CONHCH₂-(furan-2,5-diyl)-5-(CH₃)₂CHCO— | " | —C₂H₅ |
| 550 | 3-CONHC₂H₄—N(CO-CH₂-CH₂-CH₂)—5-(CH₃)₂CHCO— (pyrrolidinone) | " | —C₂H₅ |
| 551 | 3-CONHC₂H₄OC₂H₄OC₂H₅—5-(CH₃)₂CHCO— | " | —C₂H₅ |
| 552 | 3-CONHC₂H₄CN—5-(CH₃)₂CHCO— | " | —CH₂C₆H₁₁ |
| 553 | 3-CONHC₂H₄CONHCH₃—5-(CH₃)₂CHCO— | " | —CH₂C₆H₄—p-CH₃ |

TABLE II-continued

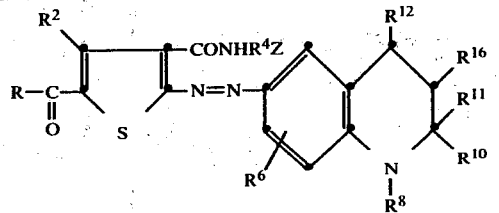

| Ex. No. | 3-CONHR⁴Z, R², RC(=O)— | R⁶, R¹⁰, R¹¹, R¹², R¹⁶ | R⁸ |
|---|---|---|---|
| 554 | 3-CONHC$_2$H$_4$OC(=O)CH$_3$—5-(CH$_3$)$_2$CHC(=O)— | " | —C$_6$H$_5$ |
| 555 | 3-CONHC$_2$H$_4$COOCH$_3$—5-(CH$_3$)$_2$CHC(=O)— | " | —C$_6$H$_4$—p-OCH$_3$ |
| 556 | 3-CONHC$_2$H$_4$SCH$_3$—5-CH$_3$C(=O)— | " | —C$_6$H$_4$—p-Cl |
| 557 | 3-CONHC(CH$_3$)$_2$—CH$_2$OH—5-CH$_3$C(=O)— | " | —C$_2$H$_5$ |
| 558 | 3-CONHC(CH$_3$)(CH$_2$OH)—CH$_2$OH—5-CH$_3$C(=O)— | " | —C$_6$H$_4$—p-CN |
| 559 | 3-CONHCH$_2$CH(OH)CH$_2$OH—5-CH$_3$C(=O)— | " | —C$_6$H$_4$—p-COOCH$_3$ |
| 560 | 3-CONHC(CH$_2$OH)$_2$—CH$_2$OH—5-CH$_3$C(=O)— | " | —C$_2$H$_4$NHCOOC$_2$H$_5$ |
| 561 | 3-CONHC$_2$H$_4$NHCH$_3$—5-CH$_3$C(=O)— | " | —C$_2$H$_4$NHC(=O)C$_6$H$_5$ |
| 562 | 3-CONHC$_2$H$_4$OC$_2$H$_4$OH—5-CH$_3$C(=O)— | " | —C$_2$H$_4$NHC(=O)C$_6$H$_4$—OCH$_3$ |
| 563 | 3-CONHC$_3$H$_6$SO$_2$CH$_3$—5-CH$_3$C(=O)— | " | —C$_2$H$_4$OCOOC$_2$H$_4$OCH$_3$ |
| 564 | 3-CONHCH$_2$-(furyl)—5-CH$_3$C(=O)— | " | —C$_2$H$_4$CONH$_2$ |
| 565 | 3-CONHC$_2$H$_4$—N(pyrrolidinone)—5-CH$_3$C(=O)— | " | —C$_2$H$_4$CONHC$_2$H$_4$OH |
| 566 | 3-CONHC$_2$H$_4$OH—5-(CH$_3$)$_2$CHC(=O)— | 2,2,4,7-tetra-CH$_3$ | —C$_2$H$_4$CON(C$_2$H$_4$OH)$_2$ |

TABLE II-continued

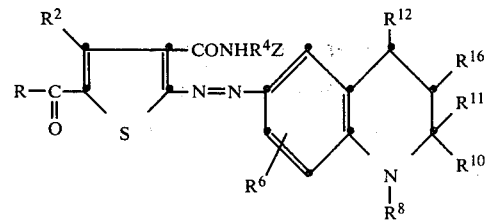

| Ex. No. | 3-CONHR⁴Z, R², RC(=O)— | R⁶, R¹⁰, R¹¹, R¹², R¹⁶ | R⁸ |
|---|---|---|---|
| 567 | 3-CONHC(CH₃)(CH₃)—CH₂OH—5-(CH₃)₂CHC(=O)— | " | —C₂H₄CONHC₃H₆OCH₃ |
| 568 | 3-CONHC(CH₃)(CH₂OH)—CH₂OH—5-(CH₃)₂CHC(=O)— | " | —C₂H₄SO₂NH₂ |
| 569 | 3-CONHCH₂CH(OH)CH₂OH—5-(CH₃)₂CHC(=O)— | " | —C₂H₄SO₂NHC₆H₁₁ |
| 570 | 3-CONHC(CH₂OH)(CH₂OH)—CH₂OH—5-(CH₃)₂CHC(=O)— | " | —C₂H₄N(CO—NH)(CO—CH₂) (succinimide-type ring) |
| 571 | 3-CONHC₂H₄NHCOCH₃—5-(CH₃)₂CHC(=O)— | " | —C₂H₄N(COCH₂)(COCH₂)O (morpholine-dione) |
| 572 | 3-CONHC₂H₄OC₂H₄OH—5-(CH₃)₂CHC(=O)— | " | —C₂H₄N-saccharinyl |
| 573 | 3-CONHC₃H₆OCH₃—5-(CH₃)₂CHC(=O)— | " | —C₂H₄N(CO—S)(CO—CH₂) |
| 574 | 3-CONHCH₂-(furyl)—5-(CH₃)₂CHC(=O)— | " | —C₂H₄—S—C(=N)N(C₂H₄CN)CH=N |
| 575 | 3-CONHC₂H₄—N(CO)(CH₂CH₂)CH₂—5-(CH₃)₂CHC(=O)— | " | —C₂H₄N(CO—CH₂)(CH₂—CH₂) |
| 576 | 3-CONHC₂H₄OC₂H₄OC₂H₅—5-(CH₃)₂CHC(=O)— | " | —CH(C₂H₅)CH₃ |
| 577 | 3-CONHC₂H₄CN—5-(CH₃)₂CHC(=O)— | " | —C₂H₄N(CO—N-CH₃)(CO—CH₂) |

TABLE II-continued

| Ex. No. | 3-CONHR⁴Z, R², RC(O)— | R⁶, R¹⁰, R¹¹, R¹², R¹⁶ | R⁸ |
|---|---|---|---|
| 578 | 3-CONHC₂H₄CONH₂—5-(CH₃)₂CHC(O)— | " | —CH₂CH(OH)CH₂OH |
| 579 | 3-CONHC₂H₄OCCH₃—5-(CH₃)₂CHC(O)— | " | —C₂H₄—N(CO—O)(CO—CH₂) (cyclic) |
| 580 | 3-CONHC₂H₄COOCH₃—5-(CH₃)₂CHC(O)— | " | —C₂H₄—N(CO—CH₂)(CO—CH₂) (cyclic) |
| 581 | 3-CONHC₂H₄OH—5-CH₃C(O)— | " | —C₂H₄—N(COCH₂)(COCH₂)CH₂ (cyclic) |
| 582 | 3-CONHC(CH₃)₂CH₂OH—5-CH₃C(O)— | " | —C₂H₄—N(CO)(CO)C₆H₄ (cyclic) |
| 583 | 3-CONHC(CH₃)(CH₂OH)—5-CH₃C(O)— | " | —C₆H₁₁ |
| 584 | 3-CONHCH₂CH(OH)CH₂OH—5-CH₃C(O)— | " | —C₂H₄SO₂CH=CH₂ |
| 585 | 3-CONHC(CH₂OH)(CH₂OH)(CH₂OH)—5-CH₃C(O)— | " | —CH₂C₆H₅ |
| 586 | 3-CONHC₂H₄NHCOCH₃—5-CH₃C(O)— | " | —CH₂CH₂NHCOC₂H₅ |
| 587 | 3-CONHC₂H₄OC₂H₄OH—5-CH₃C(O)— | " | —CH₂CH₂SO₂CH=CH₂ |
| 588 | 3-C₃H₆OCH₃—5-CH₃C(O)— | " | —CH₂CH₂NHCOCH=CH₂ |
| 589 | 3-CONHCH₂-(furan-2,5-diyl)-5-CH₃C(O)— | " | —CH₂CH₂OH |

TABLE II-continued

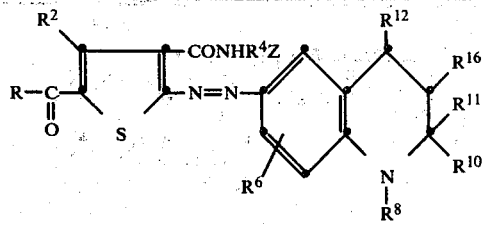

| Ex. No. | 3-CONHR⁴Z, R², RC(=O)− | R⁶, R¹⁰, R¹¹, R¹², R¹⁶ | R⁸ |
|---|---|---|---|
| 590 | 3-CONHC₂H₄−N(CO−CH₂−CH₂−)C(=O)−CH₂−5-CH₃C(=O)− | " | " |
| 591 | 3-CONHC₂H₄OH−5-(CH₃)₂CHC(=O)− | 2,7-di-CH₃ | −CH₂CHCH₂OH (OH) |
| 592 | 3-CONHC(CH₃)₂−CH₂OH−5-(CH₃)₂CHC(=O)− | " | −C₂H₄−N(CO−S)(CO−CH₂) |
| 593 | 3-CONHC(CH₃)(CH₂OH)−CH₂OH−5-(CH₃)₂CHC(=O)− | " | −C₂H₄−N(COCH₂O)(CO−CH₂) |
| 594 | 3-CONHCH₂CHCH₂OH−5-(CH₃)₂CHC(=O)− (OH) | " | −C₃H₇−n |
| 595 | 3-CONHC(CH₂OH)(CH₂OH)−CH₂OH−5-(CH₃)₂CHC(=O)− | " | −C₂H₅ |
| 596 | 3-CONHC₂H₄NHCOCH₃−5-(CH₃)₂CHC(=O)− | " | −C₂H₄OH |
| 597 | 3-CONHC₂H₄OC₂H₄OH−5-(CH₃)₂CHC(=O)− | " | −C₂H₄CONH₂ |
| 598 | 3-CONHC₃H₆OCH₃−5-(CH₃)₂CHC(=O)− | " | −H |
| 599 | 3-CONHCH₂-(furan)-5-(CH₃)₂CHC(=O)− | " | −C₂H₅ |
| 600 | 3-CONHC₂H₄−N(CO−CH₂−CH₂−)C(=O)−CH₂−5-(CH₃)₂CHC(=O)− | " | −CH₂CH₂SC₂H₅ |
| 601 | 3-CONHC₂H₄OC₂H₄OC₂H₅−5-(CH₃)₂CHC(=O)− | " | −CH₂CH₂CONH₂ |
| 602 | 3-CONHC₂H₄CN−5-(CH₃)₂CHC(=O)− | " | −CH₂CH₂CONH₂ |

TABLE II-continued

| Ex. No. | 3-CONHR$^4$Z, R$^2$, R$\overset{O}{\underset{}{C}}$— | R$^6$, R$^{10}$, R$^{11}$, R$^{12}$, R$^{16}$ | R$^8$ |
|---|---|---|---|
| 603 | 3-CONHC$_2$H$_4$CONH$_2$—5-(CH$_3$)$_2$CH$\overset{O}{\underset{}{C}}$— | " | —C$_2$H$_4$—SO$_2$CH$_3$ |
| 604 | 3-CONHC$_2$H$_4$O$\overset{O}{\underset{}{C}}$CH$_3$—5-(CH$_3$)$_2$CH$\overset{O}{\underset{}{C}}$— | " | —C$_2$H$_4$—SO$_2$—C$_2$H$_4$Cl |
| 605 | 3-CONHC$_2$H$_4$COOCH$_3$—5-(CH$_3$)$_2$CH$\overset{O}{\underset{}{C}}$— | " | —C$_2$H$_4$—SO$_2$—C$_2$H$_4$OH |
| 606 | 3-CONHC$_2$H$_4$OH—5-CH$_3$$\overset{O}{\underset{}{C}}$— | " | —C$_2$H$_4$—SO$_2$—C$_2$H$_4$CN |
| 607 | 3-CONH$\underset{CH_3}{\overset{CH_3}{C}}$—CH$_2$OH—5-CH$_3$$\overset{O}{\underset{}{C}}$— | " | —C$_2$H$_4$—SO$_2$—CH$_2$-(tetrahydrothiopyranyl) |
| 608 | 3-CONH$\underset{CH_2OH}{\overset{CH_3}{C}}$—CH$_2$OH—5-CH$_3$$\overset{O}{\underset{}{C}}$— | " | —C$_2$H$_4$—SO$_2$—C$_2$H$_4$—SO$_2$CH$_3$ |
| 609 | 3-CONHCH$_2$$\underset{OH}{C}$HCH$_2$OH—5-CH$_3$$\overset{O}{\underset{}{C}}$— | " | —C$_2$H$_4$—SO$_2$—C$_2$H$_4$—SCH$_3$ |
| 610 | 3-CONH$\underset{CH_2OH}{\overset{CH_2OH}{C}}$—CH$_2$OH—5-CH$_3$$\overset{O}{\underset{}{C}}$— | " | —CH$_2$CH$_2$CH$_2$CONH$_2$ |
| 611 | 3-CONHC$_2$H$_4$NHCOCH$_3$—5-CH$_3$$\overset{O}{\underset{}{C}}$— | " | —CH$_2$CH$_2$CH$_2$CN |
| 612 | 3-CONHC$_2$H$_4$OC$_2$H$_4$OH—5-CH$_3$$\overset{O}{\underset{}{C}}$— | " | —CH$_2$$\underset{CN}{C}$HCH$_2$CN |
| 613 | 3-C$_3$H$_6$OCH$_3$—5-CH$_3$$\overset{O}{\underset{}{C}}$— | " | —CH$_2$$\underset{CONH_2}{C}$HCH$_2$CONH$_2$ |
| 614 | 3-CONHCH$_2$-(furanyl)—5-CH$_3$$\overset{O}{\underset{}{C}}$— | " | —CH$_2$$\underset{OCH_3}{C}$HCH$_2$OCH$_3$ |
| 615 | 3-CONHC$_2$H$_4$—N(pyrrolidinon-yl)—CH$_2$—5-CH$_3$$\overset{O}{\underset{}{C}}$— | " | —C$_2$H$_4$SO$_2$N(morpholino) |

TABLE II-continued

[Structure: thiophene-based azo dye with substituents R, R², CONHR⁴Z on thiophene; phenyl ring with R⁶; N(R⁸) with R¹⁰, R¹¹, R¹², R¹⁶]

| Ex. No. | 3-CONHR⁴Z, R², RC(=O)— | R⁶, R¹⁰, R¹¹, R¹², R¹⁶ | R⁸ |
|---|---|---|---|
| 616 | 3-CONHC₂H₄OH—5-(CH₃)₂CHC(=O)— | " | —C₂H₄CONH₂ |
| 617 | 3-CONHC(CH₃)₂—CH₂OH—5-(CH₃)₂CHC(=O)— | " | " |
| 618 | 3-CONHC(CH₃)(CH₂OH)—CH₂OH—5-(CH₃)₂CHC(=O)— | " | " |
| 619 | 3-CONHCH₂CH(OH)CH₂OH—5-(CH₃)₂CHC(=O)— | " | —C₂H₄N(CO-o-C₆H₄-CH₂) (phthalimide-like) |
| 620 | 3-CONHCH(CH₂OH)(CH₂OH)—CH₂OH—5-(CH₃)₂CHC(=O)— | " | —C₂H₅ |
| 621 | 3-CONHC₂H₄NHCOCH₃—5-(CH₃)₂CHC(=O)— | " | —C₂H₅ |
| 622 | 3-CONHC₂H₄OC₂H₄OH—5-(CH₃)₂CHC(=O)— | " | —C₂H₅ |
| 623 | 3-CONHC₃H₆OCH₃—5-(CH₃)₂CHC(=O)— | " | —C₂H₅ |
| 624 | 3-CONHCH₂-(furan-2,5-diyl)-5-(CH₃)₂CHC(=O)— | " | —CH₂C₆H₅ |
| 625 | 3-CONHC₂H₄—N(succinimido)—CH₂—5-(CH₃)₂CHC(=O)— | " | —CH₂CH₂NHCOC₂H₅ |
| 626 | 3-CONHC₂H₄OC₂H₄OC₂H₅—5-(CH₃)₂CHC(=O)— | " | —CH₂CH₂SO₂CH=CH₂ |
| 627 | 3-CONHC₂H₄CN—5-(CH₃)₂CHC(=O)— | " | —CH₂CH₂NHCOCH=CH₂ |
| 628 | 3-CONHC₂H₄CONH₂—5-(CH₃)₂CHC(=O)— | " | " |

TABLE II-continued

| Ex. No. | 3-CONHR$^4$Z, R$^2$, R$\overset{O}{\underset{}{C}}$— | R$^6$, R$^{10}$, R$^{11}$, R$^{12}$, R$^{16}$ | R$^8$ |
|---|---|---|---|
| 629 | 3-CONHC$_2$H$_4$OCCH$_3$—5-(CH$_3$)$_2$CHC— (with C=O groups) | " | —C$_2$H$_4$Ph—p-NHCOCH$_3$ |
| 630 | 3-CONHC$_2$H$_4$COOCH$_3$—5-(CH$_3$)$_2$CHC(=O)— | " | —C$_2$H$_4$Ph—p-OCH$_3$ |
| 631 | 3-CONHC$_2$H$_4$OH—5-CH$_3$C(=O)— | " | —C$_2$H$_4$Ph—p-Cl |
| 632 | 3-CONHC(CH$_3$)$_2$—CH$_2$OH—5-CH$_3$C(=O)— | " | —C$_2$H$_4$Ph—p-CN |
| 633 | 3-CONHC(CH$_3$)(CH$_2$OH)—CH$_2$OH—5-CH$_3$C(=O)— | " | —C$_2$H$_4$Ph—p-COOCH$_3$ |
| 634 | 3-CONHCH$_2$CHCH$_2$OH—5-CH$_3$C(=O)— (with OH) | " | —CH(CH$_3$)C$_2$H$_5$ |
| 635 | 3-CONHC(CH$_2$OH)$_2$—CH$_2$OH—5-CH$_3$C(=O)— | " | —C$_2$H$_4$OH |
| 636 | 3-CONHC$_2$H$_4$NHCOCH$_3$—5-CH$_3$C(=O)— | " | —C$_2$H$_5$ |
| 637 | 3-CONHC$_2$H$_4$OC$_2$H$_4$OH—5-CH$_3$C(=O)— | " | —CH$_2$CH(OH)CH$_2$OH |
| 638 | 3-C$_3$H$_6$OCH$_3$—5-CH$_3$C(=O)— | " | " |
| 639 | 3-CONHCH$_2$-(furan)-5-CH$_3$C(=O)— | " | " |
| 640 | 3-CONHC$_2$H$_4$—N(pyrrolidinone)—5-CH$_3$C(=O)— | " | " |
| 641 | 3-CONHC$_2$H$_4$OH—5-(CH$_3$)$_2$CHC(=O)— | 2,5-di-CH$_3$—8-OCH$_3$ | —C$_2$H$_4$OH |

TABLE II-continued

[Structure: thiophene ring with R²/CONHR⁴Z/RC(=O)- substituents, azo-linked (N=N) to a benzene ring fused with a piperidine-like ring bearing R⁶, R¹⁰, R¹¹, R¹², R¹⁶ substituents, with N-R⁸]

| Ex. No. | 3-CONHR⁴Z, R², RC(=O)- | R⁶, R¹⁰, R¹¹, R¹², R¹⁶ | R⁸ |
|---|---|---|---|
| 642 | 3-CONHC(CH₃)₂—CH₂OH—5-(CH₃)₂CHC(=O)— | " | —C₂H₅ |
| 643 | 3-CONHC(CH₃)(CH₂OH)—CH₂OH—5-(CH₃)₂CHC(=O)— | " | —C₂H₄NHCOCH₃ |
| 644 | 3-CONHCH₂CH(OH)CH₂OH—5-(CH₃)₂CHC(=O)— | " | —C₂H₄CONH₂ |
| 645 | 3-CONHC(CH₂OH)(CH₂OH)—CH₂OH—5-(CH₃)₂CHC(=O)— | " | —CH₂CH(CH₃)CH₂OH |
| 646 | 3-CONHC₂H₄NHCOCH₃—5-(CH₃)₂CHC(=O)— | " | —CH₂CH(OH)CH₂OH |
| 647 | 3-CONHC₂H₄OC₂H₄OH—5-(CH₃)₂CHC(=O)— | " | —CH₂CH₂CH₂CH₃ |
| 648 | 3-CONHC₃H₆OCH₃—5-(CH₃)₂CHC(=O)— | " | —C₂H₄SO₂NHC₆H₅ |
| 649 | 3-CONHCH₂-(furan-2,5-diyl)-5-(CH₃)₂CHC(=O)— | " | —C₂H₄SO₂NHC₂H₄OH |
| 650 | 3-CONHC₂H₄-N(pyrrolidinone)-CH₂-5-(CH₃)₂CHC(=O)— | " | —CH(C₂H₅)CH₃ |
| 651 | 3-CONHC₂H₄OC₂H₄OC₂H₅—5-(CH₃)₂CHC(=O)— | " | —C₂H₄OH |
| 652 | 3-CONHC₂H₄CN—5-(CH₃)₂CHC(=O)— | " | —C₂H₄S-(pyridyl) |
| 653 | 3-CONHC₂H₄CONH₂—5-(CH₃)₂CHC(=O)— | " | —CH₂CH(OH)CH₂OH |

TABLE II-continued

[Structure shown at top of table: a thiophene-based azo dye compound with substituents R, R², R⁶, R⁸, R¹⁰, R¹¹, R¹², R¹⁶, and CONHR⁴Z group, linked via N=N to a substituted aniline with a fused ring containing N-R⁸]

| Ex. No. | 3-CONHR⁴Z, R², R$\overset{O}{\underset{}{C}}$— | R⁶, R¹⁰, R¹¹, R¹², R¹⁶ | R⁸ |
|---|---|---|---|
| 654 | 3-CONHC₂H₄OCOCH₃—5-(CH₃)₂CHC(O)— | " | —C₂H₄S— (imidazole/pyrazine ring) |
| 655 | 3-CONHC₂H₄COOCH₃—5-(CH₃)₂CHC(O)— | " | —C₂H₄OH |
| 656 | 3-CONHC₂H₄OH—5-CH₃C(O)— | " | —C₂H₅ |
| 657 | 3-CONHC(CH₃)₂—CH₂OH—5-CH₃C(O)— | " | —C₂H₅ |
| 658 | 3-CONHC(CH₃)(CH₂OH)—CH₂OH—5-CH₃C(O)— | " | —C₂H₄—S—C₂H₄OH |
| 659 | 3-CONHCH₂CH(OH)CH₂OH—5-CH₃C(O)— | " | —C₂H₄—S—Ph |
| 660 | 3-CONHC(CH₂OH)(CH₂OH)—CH₂OH—5-CH₃C(O)— | " | —C₂H₄—S—Ph—p-Cl |
| 661 | 3-CONHC₂H₄NHCOCH₃—5-CH₃C(O)— | " | —C₂H₄—S—Ph—p-CH₃ |
| 662 | 3-CONHC₂H₄OC₂H₄OH—5-CH₃C(O)— | " | —C₂H₄—S—Ph—p-OCH₃ |
| 663 | 3-C₃H₆OCH₃—5-CH₃C(O)— | " | —C₂H₄—S—Ph—p-NHCOCH₃ |
| 664 | 3-CONHCH₂—(furan)—5-CH₃C(O)— | " | —C₂H₄—S—Ph—p-CN |
| 665 | 3-CONHC₂H₄—N(pyrrolidinone)—CH₂—5-CH₃C(O)— | " | —C₂H₄—S—Ph—p-COOCH₃ |

TABLE III

| Ex. No. | 3-CONHR⁴Z, R², RC(O)— | R⁶, R¹⁰ | R⁸ |
|---|---|---|---|
| 666 | 3-CONHC₂H₄OH—5-(CH₃)₂CHC(O)— | 2,7-di-CH₃ | —C₂H₅ |
| 667 | " | " | —C₂H₄OH |
| 668 | " | " | —CH₂CHCH₂OH with OH |
| 669 | 3-CONHC₃H₆OCH₃—5-(CH₃)₂CHC(O)— | " | —C₂H₅ |
| 670 | " | " | —C₂H₄OH |
| 671 | " | " | —CH₂CHCH₂OH with OH |
| 672 | 3-CONHC₂H₄OC₂H₄OH—5-(CH₃)₂CHC(O)— | " | —C₂H₅ |
| 673 | " | " | —C₂H₄OH |
| 674 | " | " | —CH₂CHCH₂OH with OH |
| 675 | 3-CONHC₂H₄OH—5-(CH₃)₂CHC(O)— | " | —C₂H₅ |
| 676 | " | " | —C₂H₅ |
| 677 | " | " | —CH₂CH₂CH₂NHCOCH₃ |
| 678 | " | " | —CH₂CH₂OC₆H₅ |
| 679 | " | " | —C₂H₅ |
| 680 | " | " | —CH₂CH₂COOCH₂C₆H₅ |
| 681 | " | " | —C₂H₅ |
| 682 | " | " | —C₂H₅ |
| 683 | " | 2-CH₃ | —C₂H₅ |
| 684 | " | 2-CH₃ | —C₂H₅ |
| 685 | " | 2-CH₃ | —CH₂CH(OH)CH₂OH |
| 686 | " | 2-CH₃ | —CH₂CH₂Cl |
| 687 | " | 2-CH₃ | —CH₂CH₂CN |
| 688 | " | 2-CH₃ | —CH₂CH₂CONH₂ |
| 689 | " | 2-CH₃ | —CH₂CH₂NHCOCH₃ |
| 690 | " | 2-CH₃ | —(CH₂)₃NHCOCH₃ |
| 691 | " | 2-CH₃ | —CH₂CH₂NHCONH₂ |
| 692 | " | 2,7-di-CH₃ | —C₂H₅ |
| 693 | " | 2-CH₃—7-NHCOCH₃ | —CH₂CH₂NHCOCH=CH₂ |
| 694 | " | 2-CH₃—7-NHCOCH₃ | —CH₂CH₂NHCON(CH₃)₂ |
| 695 | " | 2-CH₃—7-NHCOCH₃ | —CH₂CH₂NHCOOC₂H₅ |
| 696 | " | 2-CH₃—7-NHCOCH₃ | —CH₂CH₂NHSO₂CH₃ |
| 697 | " | 7-NHCOCH₃ | —C₂H₄CN |
| 698 | " | " | —C₂H₄SO₂NH₂ |
| 699 | " | " | —C₂H₄CONH₂ |
| 700 | " | " | —C₃H₆NHCOCH₃ |
| 701 | " | " | —C₂H₅ |
| 702 | " | " | —C₂H₄OH |
| 703 | " | 2-CH₃—7-NHCOCH₃ | —C₂H₅ |
| 704 | " | 2,7-di-CH₃ | —CH(CH₃)₂ |
| 705 | " | 2,7-di-CH₃ | —C₂H₄C(O)NH₂ |

TABLE III-continued

Structure: R², CONHR⁴Z on thiophene ring with RC(=O)—, linked via N=N to phenyl (R⁶) fused to ring with R¹⁰, R⁸, O

| Ex. No. | 3-CONHR⁴Z, R², RC(=O)— | R⁶, R¹⁰ | R⁸ |
|---|---|---|---|
| 706 | " | 2,7-di-CH₃ | —C₂H₄CN |
| 707 | " | " | —C₂H₄φ |
| 708 | " | " | —CH₂φ |
| 709 | 3-CONHC₃H₆OCH₃—5-(CH₃)₂CHC(=O)— | 2,7-di-CH₃ | —C₂H₅ |
| 710 | " | 2,7-di-CH₃ | —C₂H₅ |
| 711 | " | 2,7-di-CH₃ | —CH₂CH₂CH₂NHCOCH₃ |
| 712 | " | 2,7-di-CH₃ | —CH₂CH₂OH |
| 713 | " | 2,7-di-CH₃ | —C₂H₅ |
| 714 | " | 2,7-di-CH₃ | —CH₂CH₂COOCH₂C₆H₅ |
| 715 | " | 2,7-di-CH₃ | —C₂H₅ |
| 716 | " | 2,7-di-CH₃ | —C₂H₅ |
| 717 | " | 2-CH₃ | —C₂H₅ |
| 718 | " | 2-CH₃ | —C₂H₅ |
| 719 | " | 2-CH₃ | —CH₂CH(OH)CH₂OH |
| 720 | " | 2-CH₃ | —CH₂CH₂Cl |
| 721 | " | 2-CH₃ | —CH₂CH₂CN |
| 722 | " | 2-CH₃ | —CH₂CH₂CONH₂ |
| 723 | " | 2-CH₃ | —CH₂CH₂NHCOCH₃ |
| 724 | " | 2-CH₃ | —(CH₂)₃NHCOCH₃ |
| 725 | " | 2-CH₃ | —CH₂CH₂NHCONH₂ |
| 726 | " | 2,7-di-CH₃ | —C₂H₅ |
| 727 | " | 2-CH₃—7-NHCOCH₃ | —CH₂CH₂NHCOCH=CH₂ |
| 728 | " | 2-CH₃—7-NHCOCH₃ | —CH₂CH₂NHCON(CH₃)₂ |
| 729 | " | 2-CH₃—7-NHCOCH₃ | —CH₂CH₂NHCOOC₂H₅ |
| 730 | " | 2-CH₃—7-NHCOCH₃ | —CH₂CH₂NHSO₂CH₃ |
| 731 | " | 7-NHCOCH₃ | —C₂H₄CN |
| 732 | " | " | —C₂H₄SO₂NH₂ |
| 733 | " | " | —C₂H₄CONH₂ |
| 734 | " | " | —C₃H₆NHCOCH₃ |
| 735 | " | " | —C₂H₅ |
| 736 | " | " | —C₂H₄OH |
| 737 | " | 2-CH₃—7-NHCOCH₃ | —C₂H₅ |
| 738 | " | 2,7-di-CH₃ | —CH(CH₃)₂ |
| 739 | " | 2,7-di-CH₃ | —C₂H₄C(=O)NH₂ |
| 740 | " | 2,7-di-CH₃ | —C₂H₄CN |
| 741 | " | " | —C₂H₄φ |
| 742 | " | " | —CH₂φ |
| 743 | 3-CONHC₂H₄OC₂H₄OH—5-(CH₃)₂CHC(=O)— | 2,7-di-CH₃ | —C₂H₅ |
| 744 | " | 2,7-di-CH₃ | —C₂H₅ |
| 745 | " | 2,7-di-CH₃ | —CH₂CH₂CH₂NHCOCH₃ |
| 746 | " | 2,7-di-CH₃ | —CH₂CH₂OH |
| 747 | " | 2,7-di-CH₃ | —C₂H₅ |
| 748 | " | 2,7-di-CH₃ | —CH₂CH₂COOCH₂C₆H₅ |
| 749 | " | 2,7-di-CH₃ | —C₂H₅ |
| 750 | " | 2,7-di-CH₃ | —C₂H₅ |
| 751 | " | 2-CH₃ | —C₂H₅ |
| 752 | " | 2-CH₃ | —C₂H₅ |
| 753 | " | 2-CH₃ | —CH₂CH(OH)CH₂OH |
| 754 | " | 2-CH₃ | —CH₂CH₂Cl |
| 755 | " | 2-CH₃ | —CH₂CH₂CN |
| 756 | " | 2-CH₃ | —CH₂CH₂CONH₂ |
| 757 | " | 2-CH₃ | —CH₂CH₂NHCOCH₃ |
| 758 | " | 2-CH₃ | —(CH₂)₃NHCOCH₃ |
| 759 | " | 2-CH₃ | —CH₂CH₂NHCOCNH₂ |
| 760 | " | 2,7-di-CH₃ | —C₂H₅ |
| 761 | " | 2-CH₃—7-NHCOCH₃ | —CH₂CH₂NHCOCH=CH₂ |

TABLE III-continued

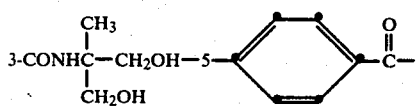

| Ex. No. | 3-CONHR⁴Z, R², RC(O)— | R⁶, R¹⁰ | R⁸ |
|---|---|---|---|
| 762 | " | 2-CH₃—7-NHCOCH₃ | —CH₂CH₂NHCON(CH₃)₂ |
| 763 | " | 2-CH₃—7-NHCOCH₃ | —CH₂CH₂NHCOOC₂H₅ |
| 764 | " | 2-CH₃—7-NHCOCH₃ | —CH₂CH₂NHSO₂CH₃ |
| 765 | " | 7-NHCOCH₃ | —C₂H₄CN |
| 766 | " | " | —C₂H₄SO₂NH₂ |
| 767 | " | " | —C₂H₄CONH₂ |
| 768 | " | " | —C₃H₆NHCOCH₃ |
| 769 | " | " | —C₂H₅ |
| 770 | " | " | —C₂H₄OH |
| 771 | " | 2-CH₃—7-NHCOCH₃ | —C₂H₅ |
| 772 | " | 2,7-di-CH₃ | —C₂H₅ |
| 773 | " | 2,7-di-CH₃ | —C₂H₄OH |
| 774 | " | 2,7-di-CH₃ | —CH₂CHOHCH₂OH |
| 775 | " | 2,7-di-CH₃ | —CH(CH₃)₂ |
| 776 | " | 2,7-di-CH₃ | —C₂H₄C(O)NH₂ |
| 777 | " | 2,7-di-CH₃ | —C₂H₄CN |
| 778 | " | " | —C₂H₄φ |
| 779 | " | " | —CH₂φ |
| 780 | 3-CONHC₂H₄OH—5-(CH₃)₂CHC(O)— | " | —C₂H₅ |
| 781 | 3-CONHC(CH₃)₂CH₂OH—5-(CH₃)₂CHC(O)— | " | —C₂H₄CONHC₂H₄OH |
| 782 | 3-CONHC(CH₃)(CH₂OH)—5-(4-C(O)-C₆H₄)— | " | —C₂H₄CON(C₂H₄OH)₂ |
| 783 | 3-CONHCH₂CH(OH)CH₂OH—5-(2-CH₃-4-C(O)-C₆H₃)— | " | —C₂H₄CONHC₃H₆OCH₃ |
| 784 | 3-CONHC(CH₂OH)₂(CH₂OH)—5-(2-Cl-4-C(O)-C₆H₃)— | " | —C₂H₄SO₂NH₂ |
| 785 | 3-CONHC₂H₄NHCOCH₃—5-(2-OCH₃-4-C(O)-C₆H₃)— | " | —C₂H₄SO₂NHC₆H₁₁ |
| 786 | 3-CONHC₂H₄OC₂H₄OH—4-CH₃—5-(CH₃)₂CHC(O)— | " | —C₂H₄-N(CO-NH)(CO-CH₂) (hydantoin) |

TABLE III-continued

Structure: thiophene ring with R²/CONHR⁴Z at 3,4 positions and RC(O)- at 5, connected via N=N to phenyl bearing R⁶ and N(R⁸)(R¹⁰) groups with adjacent C=O.

| Ex. No. | 3-CONHR⁴Z, R², RC(O)- | R⁶, R¹⁰ | R⁸ |
|---|---|---|---|
| 787 | 3-CONHC₃H₆Cl—5-(CH₃)₂CHC(O)— | " | —C₂H₄—N(COCH₂)(COCH₂)O (morpholine-dione) |
| 788 | 3-CONHCH₂-(furan)-5-(CH₃)₂CHC(O)— | " | —C₂H₄—N(C(O))(SO₂)-benzo (saccharin-like) |
| 789 | 3-CONHC₂H₄—N(pyrrolidinone)—CH₂—5-(CH₃)₂CHC(O)— | " | —C₂H₄—N(CO—S)(CO—CH₂) |
| 790 | 3-CONHC₂H₄OC₂H₄OC₂H₅—5-(CH₃)₂CHC(O)— | " | —C₂H₄—S—(triazole)—NRC₂H₄OH |
| 791 | 3-CONHC₂H₄CN—5-(CH₃)₂CHC(O)— | " | —C₂H₄—N(CO—CH₂)(CH₂—CH₂) |
| 792 | 3-CONHC₂H₄CONHCH₃—5-(CH₃)₂CHC(O)— | " | —CH(C₂H₅)CH₃ |
| 793 | 3-CONHC₂H₄OC(O)CH₃—5-(CH₃)₂CHC(O)— | " | —C₂H₄—N(CO—N—CH₃)(CO—CH₂) |
| 794 | 3-CONHC₂H₄COOCH₃—5-(CH₃)₂CHC(O)— | " | —CH₂CHCH₂OH with OH |
| 795 | 3-CONHC₂H₄SCH₃—5-CH₃C(O)— | " | —C₂H₄—N(CO—O)(CO—CH₂) |
| 796 | 3-CONHC(CH₃)₂—CH₂OH—5-CH₃C(O)— | " | —C₂H₄OH |
| 797 | 3-CONHC(CH₃)(CH₂OH)—CH₂OH—5-CH₃C(O)— | " | —C₂H₄—N(CO—S)(CO—CH₂) |

TABLE III-continued

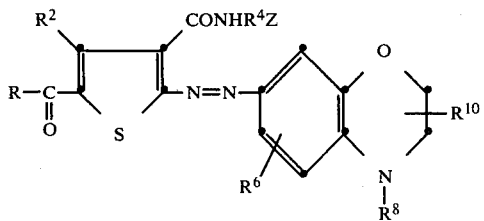

| Ex. No. | 3-CONHR⁴Z, R², RC(O)— | R⁶, R¹⁰ | R⁸ |
|---|---|---|---|
| 798 | 3-CONHCH₂CHCH₂OH—5-CH₃C(O)—  \| OH | " | —C₂H₄—N(COCH₂O)(CO—CH₂) (morpholinedione ring) |
| 799 | 3-CONHC(CH₂OH)(CH₂OH)—CH₂OH—5-CH₃C(O)— | " | " |
| 800 | 3-CONHC₂H₄NHCH₃—5-CH₃C(O)— | " | —C₃H₇—n |
| 801 | 3-CONHC₂H₄OC₂H₄OH—5-CH₃C(O)— | " | —C₂H₄OH |
| 802 | 3-CONHC₃H₆SO₂CH₃—5-CH₃C(O)— | " | —C₂H₄CONH₂ |
| 803 | 3-CONHCH₂-(furan)-5-CH₃C(O)— | " | —H |
| 804 | 3-CONHC₂H₄—N(C(O))—CH₂—5-CH₃C(O)— (succinimide-type ring with CH₂—CH₂) | " | " |
| 805 | 3-CONHC₂H₄OH—5-(CH₃)₂CHC(O)— | " | —C₂H₄OH |
| 806 | 3-CONHC(CH₃)(CH₃)—CH₂OH—5-(CH₃)₂CHC(O)— | " | —CH₂CH₂SC₂H₅ |
| 807 | 3-CONHC(CH₃)—CH₂OH—5-(CH₃)₂CHC(O)—  \| CH₂OH | " | —CH₂CH₂CONH₂ |
| 808 | 3-CONHCH₂CHCH₂OH—5-(CH₃)₂CHC(O)—  \| OH | " | —CH₂CH₂CONH₂ |
| 809 | 3-CONHC(CH₂OH)(CH₂OH)—CH₂OH—5-(CH₃)₂CHC(O)— | " | —C₂H₄—SO₂CH₃ |
| 810 | 3-CONHC₂H₄NHCOCH₃—5-(CH₃)₂CHC(O)— | " | —C₂H₄—SO₂—C₂H₄Cl |

TABLE III-continued

[Structure: thiophene ring with R²,  CONHR⁴Z, RC(O)– substituents, linked via N=N azo to a benzene ring bearing R⁶, R¹⁰, and N-R⁸ substituents]

| Ex. No. | 3-CONHR⁴Z, R², RC(O)– | R⁶, R¹⁰ | R⁸ |
|---|---|---|---|
| 811 | 3-CONHC₂H₄OC₂H₄OH—5-(CH₃)₂CHC(O)– | " | —C₂H₄—SO₂—C₂H₄OH |
| 812 | 3-CONHC₃H₆OCH₃—5-(CH₃)₂CHC(O)– | " | —C₂H₄—SO₂—C₂H₄CN |
| 813 | 3-CONHCH₂-(furan)-5-(CH₃)₂CHC(O)– | " | —C₂H₄—SO₂—CH₂-(thiopyran) |
| 814 | 3-CONHC₂H₄—N(pyrrolidinone)—CH₂—5-(CH₃)₂CHC(O)– | " | —C₂H₄—SO₂—C₂H₄—SO₂CH₃ |
| 815 | 3-CONHC₂H₄OC₂H₄OC₂H₅—5-(CH₃)₂CHC(O)– | " | —C₂H₄—SO₂—C₂H₄—SCH₃ |
| 816 | 3-CONHC₂H₄CN—5-(CH₃)₂CHC(O)– | " | —C₂H₄—SO₂—C₂H₄OOCCH₃ |
| 817 | 3-CONHC₂H₄CONH₂—5-(CH₃)₂CHC(O)– | " | —C₂H₄—SO₂—C₂H₄OCH₃ |
| 818 | 3-CONHC₂H₄OC(O)CH₃—5-(CH₃)₂CHC(O)– | " | —C₂H₄—N(C(O))—CH₂-(benzene) (isoindolinone) |
| 819 | 3-CONHC₂H₄COOCH₃—5-(CH₃)₂CHO(O)– | " | —C₂H₄S-(pyridine) |
| 820 | 3-CONHC₂H₄OH—5-CH₃C(O)– | " | —C₂H₄S—C(=N-)(S-)(benzothiazole, methyl) |
| 821 | 3-CONHC(CH₃)₂—CH₂OH—5-CH₃C(O)– | " | —C₂H₄—SO₂—C₂H₄N(CH₃)₂ |

TABLE III-continued

| Ex. No. | 3-CONHR⁴Z, R², RC(O)— | R⁶, R¹⁰ | R⁸ |
|---|---|---|---|
| 822 | 3-CONHC(CH₃)(CH₂OH)(CH₂OH)—5-CH₃C(O)— | " | —C₂H₄S—C(=N-Ar)—O— (benzoxazole type) |
| 823 | 3-CONHCH₂CHOHCH₂OH—5-CH₃C(O)— | " | —CH₂CH(CN)CH₂CN |
| 824 | 3-CONHC(CH₂OH)(CH₂OH)(CH₂OH)—5-CH₃C(O)— | " | —C₂H₄—SO₂—CH₂— (furan) |
| 825 | 3-CONHC₂H₄NHCOCH₃—5-CH₃C(O)— | " | —CH₂CH₂NHCOC₂H₅ |
| 826 | 3-CONHC₂H₄OC₂H₄OH—5-CH₃C(O)— | " | —CH₂CH₂SO₂CH=CH₂ |
| 827 | 3-C₃H₆OCH₃—5-CH₃C(O)— | " | —CH₂CH₂NHCOCH=CH₂ |
| 828 | 3-CONHCH₂—(furan)—5-CH₃C(O)— | " | " |
| 829 | 3-CONHC₂H₄—N(pyrrolidinone with CH₂-5-CH₃C(O)-) | " | " |
| 830 | 3-CONHC₂H₄OH—5-(CH₃)₂CHC(O)— | " | —CH₂CHOHCH₂OH |
| 831 | 3-CONHC(CH₃)(CH₃)CH₂OH—5-(CH₃)₂CHC(O)— | " | " |
| 832 | 3-CONHC(CH₃)(CH₂OH)(CH₂OH)—5-(CH₃)₂CHC(O)— | " | " |
| 833 | 3-CONHCH₂CHOHCH₂OH—5-(CH₃)₂CHC(O)— | " | " |

TABLE III-continued

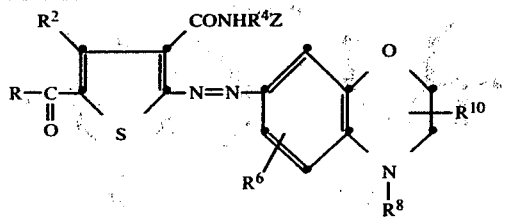

| Ex. No. | 3-CONHR⁴Z, R², RC(=O)— | R⁶, R¹⁰ | R⁸ |
|---|---|---|---|
| 834 | 3-CONHC(CH₂OH)(CH₂OH)—CH₂OH—5-(CH₃)₂CHC(=O)— | " | " |
| 835 | 3-CONHC₂H₄NHCOCH₃—5-(CH₃)₂CHC(=O)— | " | " |
| 836 | 3-CONHC₂H₄OC₂H₄OH—5-(CH₃)₂CHC(=O)— | " | " |
| 837 | 3-CONHC₃H₆OCH₃—5-(CH₃)₂CHC(=O)— | " | —C₂H₄—S—C₂H₄OH |
| 838 | 3-CONHCH₂-(furfuryl)—5-(CH₃)₂CHC(=O)— | " | —C₂H₄—S—Ph |
| 839 | 3-CONHC₂H₄—N(pyrrolidinone-CH₂—)—5-(CH₃)₂CHC(=O)— | " | —C₂H₄—S—Ph—p-Cl |
| 840 | 3-CONHC₂H₄OC₂H₄OC₂H₅—5-(CH₃)₂CHC(=O)— | " | —C₂H₄—S—Ph—p-CH₃ |
| 841 | 3-CONHC₂H₄CN—5-(CH₃)₂CHC(=O)— | " | —C₂H₄—S—Ph—p-OCH₃ |
| 842 | 3-CONHC₂H₄CONH₂—5-(CH₃)₂CHC(=O)— | " | —C₂H₄—S—Ph—p-NHCOCH₃ |
| 843 | 3-CONHC₂H₄OC(=O)CH₃—5-(CH₃)₂CHC(=O)— | " | —C₂H₄—S—Ph—p-CN |
| 844 | 3-CONHC₂H₄COOCH₃—5-(CH₃)₂CHC(=O)— | " | —C₂H₄—S—Ph—p-COOCH₃ |
| 845 | 3-CONHC₂H₄OH—5-CH₃C(=O)— | " | —CH₂CH(CONH₂)CH₂CONH₂ |
| 846 | 3-CONHC(CH₃)(CH₃)—CH₂OH—5-CH₃C(=O)— | " | —CH₂CH(OCH₃)CH₂OCH₃ |
| 847 | 3-CONHC(CH₃)(CH₂OH)—CH₂OH—5-CH₃C(=O)— | " | —CH₂CH₂CH₂N(morpholino: CO—CH₂/CH₂—CH₂) |

TABLE III-continued

R² CONHR⁴Z structure with R-C(=O)-, S, N=N-aryl with R⁶, R¹⁰, R⁸ substituents

| Ex. No. | 3-CONHR⁴Z, R², RC(=O)— | R⁶, R¹⁰ | R⁸ |
|---|---|---|---|
| 848 | 3-CONHCH₂CHCH₂OH(OH)—5-CH₃C(=O)— | " | —C₂H₄Ph—p-NHCOCH₃ |
| 849 | 3-CONHC(CH₂OH)(CH₂OH)—CH₂OH—5-CH₃C(=O)— | " | —C₂H₄Ph—p-OCH₃ |
| 850 | 3-CONHC₂H₄NHCOCH₃—5-CH₃C(=O)— | " | —C₂H₄N attached to benzisothiazolone (C(=O), SO₂, phenyl) |
| 851 | 3-CONHC₂H₄OC₂H₄OH—5-CH₃C(=O)— | " | —C₂H₄SO₂N(C₂H₄OH)₂ |
| 852 | 3-CONHC₃H₆OCH₃—5-CH₃C(=O)— | " | —C₂H₄SO₂N(CH₃)C₂H₄OH |
| 853 | 3-CONHCH₂-(furyl)-5-CH₃C(=O)— | " | —CH(C₂H₅)CH₃ |
| 854 | 3-CONHC₂H₄—N(piperidinone with —CH₂—5-CH₃C(=O)—) | " | —C₂H₄OH |

The invention has been described in detail with particular reference to preferred embodiments thereof, but it will be understood tht variations and modifications can be effected within the spirit and scope of the invention.

We claim:

1. A compound of the formula

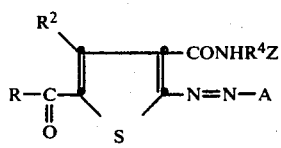

in which $R^4$ is straight or branched alkylene, Z represents 1–3 groups selected from —OH, alkanoyloxy, alkoxy, alkoxycarbonyl, alkoxy-alkoxy, mono- and dialkylamino, —CN, carbamoyl, alkoxycarbonylamino, alkyl substituted carbamoyl, formamido, alkanoylamino, hydroxy substituted alkoxy, halogen, alkylthio, alkylsulfonyl, furyl, and pyrrolidono; R is selected from straight or branched alkyl, phenyl and phenyl substituted with straight or branched alkyl, halogen, or straight or branched alkoxy; $R^2$ is hydrogen or alkyl; and A is an azo dye coupler selected from

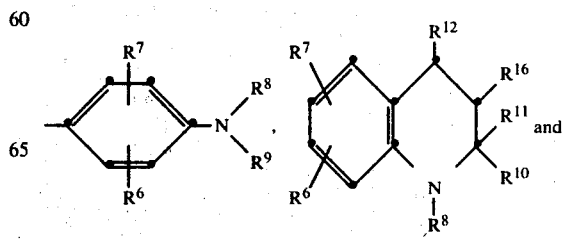

-continued

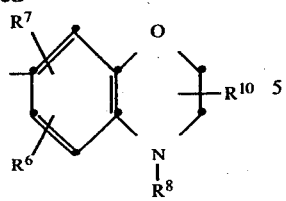

wherein
R⁶ and R⁷ are each selected from hydrogen, fluorine, chlorine, bromine, alkyl, cycloalkyl, alkoxy, phenoxy, alkylthio, arylthio, and radicals having the formula —NH-X-R¹³ in which X is —CO—, —COO—, or —SO₂— and R¹³ is selected from alkyl and alkyl substituted with halogen, hydroxy, phenoxy, aryl, cyano, cycloalkyl, alkylsulfonyl, alkylthio, alkanoyloxy, and alkoxy, and when X is —CO—, R¹³ also is selected from hydrogen, amino, alkylamino, alkylcarbamoyl, dialkylamino, arylamino, aryl, and furyl;

R⁸ and R⁹ are selected from hydrogen; cycloalkyl; cycloalkyl substituted with one or two groups selected from alkyl, —OH, alkoxy, halogen, or hydroxy substituted alkyl; phenyl; phenyl substituted with alkyl, alkoxy, halogen, alkanoylamino, cyano or alkoxycarbonyl; straight or branched alkenyl; straight or branched alkyl of 1–8 carbons and such alkyl substituted with the following: hydroxy; halogen; cyano; succinimido; glutarimido; phthalimido; 2-pyrrolidono; cyclohexyl; phenyl; phenyl substituted with alkyl, alkoxy, halogen, alkanoylamino, cyano, or alkoxycabonyl; alkanoylamino; vinylsulfonyl; acrylamido; phthalimidinyl; benzoylsulfonicimidyl; alkylsulfonamido; phenylsulfonamido; alkoxycarbonylamino; alkylcarbamoyloxy; alkoxycarbonyloxy;

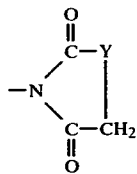

wherein Y is —NH—, —NH-lower alkyl—, —O—, —S—, or —CH₂O—; —S-R¹⁴ wherein R¹⁴ is alkyl, hydroxyalkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

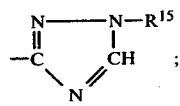

—SO₂ substituted with alkenyl, amino, cyclohexylamino, phenylamino, chloroalkylamino, alkyl, chloroalkyl, hydroxyalkyl, cyanoalkyl, cyclohexylalkyl, alkylsulfonylalkyl, alkylthioalkyl, alkanoyloxyalkyl, alkoxyalkyl, aminoalkyl, alkylaminoalkyl, alkylcarbamoylalkyl, dialkylaminoalkyl, phenylaminoalkyl, phenylalkyl, furylalkyl, alkylamino, morpholino, hydroxyalkylamino, or hydroxyalkyl-alkylamino; —OXR¹³; —NH-X-R¹³;

—X-R¹³; —CONR¹⁵R¹⁵; wherein R¹³ and X are as defined above and each R¹⁵ is selected from H and R¹³; alkoxy; alkoxy substituted with hydroxy, cyano, alkanoyloxy, or alkoxy; phenoxy; phenoxy substituted with one or more of alkyl, alkoxy or halogen; and R⁸ and R⁹ representing a single, combined group selected from pentamethylene, ethyleneoxyethylene and ethylenesulfonylethylene, which, with the nitrogen atom to which each is attached, forms a six membered ring;

R¹⁰, R¹¹ and R¹² are each selected from hydrogen and alkyl; R¹⁶ is selected from —OH, —Cl, —CONH₂, —CONH-alkyl, alkoxy, phenoxy, —SR¹⁴, and —OXR¹³ wherein R¹³ and R¹⁴ are as defined above; and wherein each of the above alkyl and alkylene moieties of the various groups where not otherwise specified contain from 1–6 carbons.

2. A compound according to claim 1 wherein
R is straight or branched lower alkyl;
R² is hydrogen;
R⁴ is lower alkylene;
Z is one or two groups selected from hydroxy, carbamoyl, lower alkanoylamino, pyrrolidono, alkoxy, hydroxyalkoxy, and lower alkanoyloxy; and
A is a coupler moiety of one of the formulae

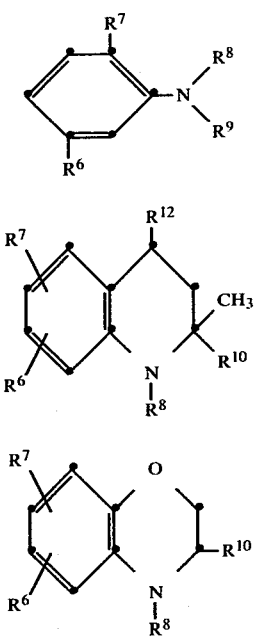

wherein
R⁶ is lower alkyl, lower alkoxy, lower alkanoylamino, or lower alkoxycarbonylamino;
R⁷ is hydrogen, lower alkyl, or lower alkoxy;
R⁸ and R⁹ are the same or different and selected from hydrogen, lower alkyl, lower alkyl substituted with hydroxy, alkoxy, alkoxyalkoxy, hydroxyalkoxy, carbamoyl, lower alkylcarbamoyl, lower alkanoylamino, sulfamoyl, lower alkylsulfamoyl, phenyl, cyclohexyl, 2-pyrrolidono, phthalimido, succinimido, cyano, phenoxy, alkylsulfonyl, phthalimidinyl, benzoylsulfonicimidyl, triazolylthio, lower alkylsulfonamido, —SO₂NH₂, —SO₂NHR, phenylsulfonamido, lower alkoxycarbonylamino, lower alkylcarbamoyloxy, lower alkoxycarbonyl, lower alkoxycarbonyloxy;

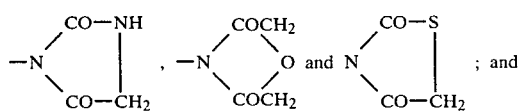

$R^{10}$ and $R^{12}$ are each hydrogen or lower alkyl.

3. The azo compound of claim 1 having the formula

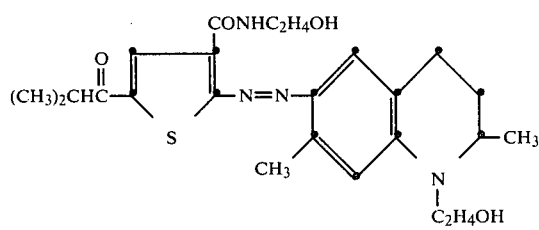

4. The azo compound of claim 1 having the formula

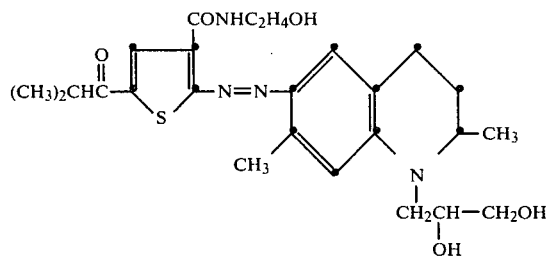

5. The azo compound of claim 1 having the formula

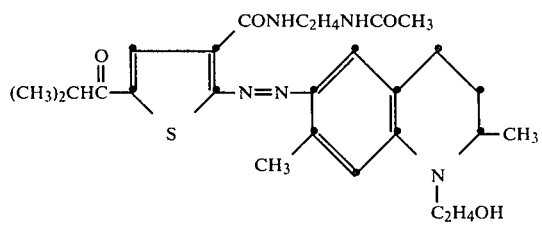

6. The azo compound of claim 1 having the formula

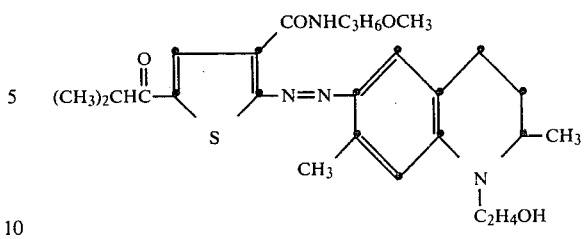

7. The azo compound of claim 1 having the formula

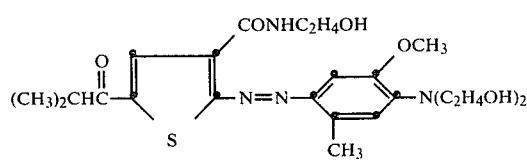

8. The azo compound of claim 1 having the formula

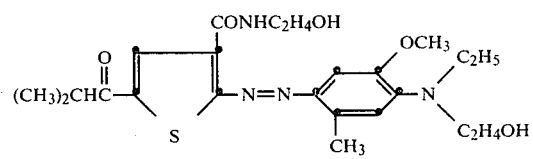

9. The azo compound of claim 1 having the formula

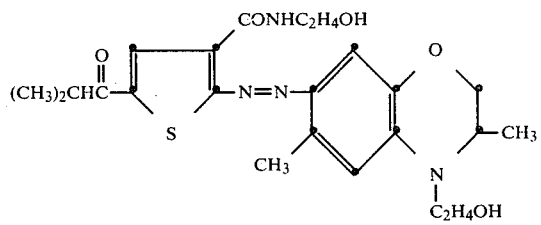

10. The process for preparing a compound of claim 1 comprising reacting at between 25° C. and 100° C. a compound of the formula

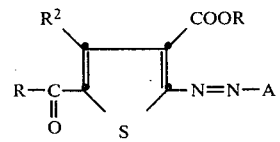

with an amine of the formula $H_2N\text{-}R^4Z$ wherein R, $R^2$, A, $R^4$, and Z are as defined in claim 1.

* * * * *